(12) United States Patent
Iiyama et al.

(10) Patent No.: US 9,685,672 B2
(45) Date of Patent: Jun. 20, 2017

(54) HYDROGEN GENERATION APPARATUS, FUEL CELL SYSTEM INCLUDING THE SAME, METHOD OF OPERATING HYDROGEN GENERATION APPARATUS AND METHOD OF OPERATING FUEL CELL SYSTEM

(71) Applicant: PANASONIC CORPORATION, Osaka (JP)

(72) Inventors: Shigeru Iiyama, Osaka (JP); Kiyoshi Taguchi, Osaka (JP); Tomonori Aso, Nara (JP); Hiroshi Tatsui, Shiga (JP); Akinori Yukimasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 14/379,154

(22) PCT Filed: Nov. 19, 2013

(86) PCT No.: PCT/JP2013/006765
§ 371 (c)(1),
(2) Date: Aug. 15, 2014

(87) PCT Pub. No.: WO2014/097537
PCT Pub. Date: Jun. 26, 2014

(65) Prior Publication Data
US 2015/0349364 A1    Dec. 3, 2015

(30) Foreign Application Priority Data

Dec. 19, 2012  (JP) .................................. 2012-277232
Apr. 17, 2013  (JP) .................................. 2013-086360

(51) Int. Cl.
*H01M 8/12*    (2016.01)
*B01J 19/24*   (2006.01)
(Continued)

(52) U.S. Cl.
CPC ....... *H01M 8/0618* (2013.01); *B01J 19/0006* (2013.01); *B01J 19/24* (2013.01);
(Continued)

(58) Field of Classification Search
CPC ....................................................... C01B 3/00
See application file for complete search history.

(56) References Cited

U.S. PATENT DOCUMENTS 4,171,637 A * 10/1979 Blanke ................ G01M 15/104
                                                        701/101
6,045,352 A *  4/2000 Nicholson ............. F24H 9/2085
                                                        126/116 A
(Continued)

FOREIGN PATENT DOCUMENTS

EP     2506355 A1    10/2012
JP   2004-093204 A    3/2004
JP   2006-282425 A   10/2006

OTHER PUBLICATIONS

Extended European Search Report issued in Application No. 13864284.8 dated Jul. 8, 2015.
(Continued)

*Primary Examiner* — Matthew Merkling
(74) *Attorney, Agent, or Firm* — McDermott Will & Emery LLP

(57) ABSTRACT

A hydrogen generation apparatus according to the present invention includes: a reformer configured to generate a hydrogen-containing gas through a reforming reaction; a combustor configured to heat the reformer; an air supply device configured to supply air to the combustor; a fuel
(Continued)

supply device configured to supply a fuel to the combustor; a CO detector configured to detect a carbon monoxide concentration in a flue gas discharged from the combustor; and a controller configured to control at least one of the air supply device and the fuel supply device to increase an air ratio in the combustor such that the CO concentration in the flue gas increases, and then test the CO detector for abnormality.

24 Claims, 22 Drawing Sheets

(51) Int. Cl.

| | |
|---|---|
| *C01B 3/38* | (2006.01) |
| *H01M 8/0612* | (2016.01) |
| *H01M 8/1018* | (2016.01) |
| *H01M 8/086* | (2016.01) |
| *B01J 19/00* | (2006.01) |
| *H01M 8/0444* | (2016.01) |
| *H01M 8/04746* | (2016.01) |
| *H01M 8/124* | (2016.01) |

(52) U.S. Cl.
CPC ............... *C01B 3/38* (2013.01); *C01B 3/384* (2013.01); *H01M 8/0444* (2013.01); *H01M 8/04776* (2013.01); *H01M 8/086* (2013.01); *H01M 8/1018* (2013.01); *H01M 8/12* (2013.01); *B01J 2219/00049* (2013.01); *B01J 2219/00051* (2013.01); *B01J 2219/24* (2013.01); *C01B 2203/0227* (2013.01); *C01B 2203/0233* (2013.01); *C01B 2203/0811* (2013.01); *C01B 2203/1211* (2013.01); *C01B 2203/1695* (2013.01); *H01M 2008/1095* (2013.01); *H01M 2008/1293* (2013.01); *H01M 2300/0008* (2013.01); *H01M 2300/0074* (2013.01); *H01M 2300/0082* (2013.01)

(56) References Cited

U.S. PATENT DOCUMENTS

| | | |
|---|---|---|
| 2008/0251379 A1 | 10/2008 | Mayer |
| 2009/0092883 A1 | 4/2009 | Ozeki et al. |
| 2009/0117426 A1 | 5/2009 | Harada et al. |
| 2011/0076579 A1 | 3/2011 | Masui |
| 2012/0077101 A1 | 3/2012 | Harada et al. |

OTHER PUBLICATIONS

International Search Report issued in International Application No. PCT/JP2013/006765 dated Dec. 17, 2013.

\* cited by examiner

HYDROGEN GENERATION APPARATUS, FUEL CELL SYSTEM INCLUDING THE SAME, METHOD OF OPERATING HYDROGEN GENERATION APPARATUS AND METHOD OF OPERATING FUEL CELL SYSTEM

RELATED APPLICATIONS

This application is the U.S. National Phase under 35 U.S.C. §371 of International Application No. PCT/JP2013/006765, filed on Nov. 19, 2013 which in turn claims the benefit of Japanese Application No. 2012-277232, filed on Dec. 19, 2012, and Japanese Application No. 2013-086360, filed Apr. 17, 2013, the disclosures of which are incorporated by reference herein.

TECHNICAL FIELD

The present invention relates to a hydrogen generation apparatus, a fuel cell system including the same, a method of operating a hydrogen generation apparatus, and a method of operating a fuel cell system.

BACKGROUND ART

Fuel cell systems usually include a hydrogen generation apparatus that includes a reformer, because an infrastructure for supplying hydrogen as a fuel has not been developed. The hydrogen generation apparatus includes a combustor. The combustor is configured to combust, for example, a fuel that has not been used by the fuel cell, thereby heating the reformer. Among such fuel cell systems, there is a known fuel cell system that includes a carbon monoxide sensor configured to detect the concentration of carbon monoxide contained in exhaust gas discharged from a combustor (see Patent Literature 1, for example).

It has been known that the carbon monoxide sensor included in the fuel cell system disclosed in Patent Literature 1 is tested for its detection sensitivity by using a test gas that contains carbon monoxide at a known concentration (see Patent Literature 2 and Patent Literature 3, for example).

CITATION LIST

Patent Literature

PTL 1: WO2010/010699
PTL 2: Japanese Laid-Open Patent Application Publication No. 2008-261857
PTL 3: Japanese Laid-Open Patent Application Publication No. 2004-93204

SUMMARY OF INVENTION

Technical Problem

However, in order to test the detection sensitivity of the carbon monoxide sensor included in such a conventional fuel cell system by using a test gas, the fuel cell system needs to include test gas supply equipment. This is unfavorable since the inclusion of the test gas supply equipment causes increases in the size and cost of the fuel cell system. In a case where the test gas supply equipment cannot be incorporated in the fuel cell system, the test gas supply equipment needs to be carried to the installation location of the fuel cell system. In this case, there is a problem in that the work of testing the detection sensitivity of a CO detector becomes complex and cumbersome.

The present invention solves the above-described conventional problems. An object of the present invention is to provide a hydrogen generation apparatus, a fuel cell system including the hydrogen generation apparatus, a method of operating a hydrogen generation apparatus, and a method of operating a fuel cell system, which are capable of testing the detection sensitivity of a CO detector more easily than conventional art.

Solution to Problem

In order to solve the above-described conventional problems, a hydrogen generation apparatus according to the present invention includes: a reformer configured to generate a hydrogen-containing gas through a reforming reaction; a combustor configured to heat the reformer; an air supply device configured to supply air to the combustor; a fuel supply device configured to supply a fuel to the combustor; a CO detector configured to detect a carbon monoxide concentration in a flue gas discharged from the combustor; and a controller configured to control at least one of the air supply device and the fuel supply device to increase an air ratio in the combustor such that the CO concentration in the flue gas increases, and then test the CO detector for abnormality.

Advantageous Effects of Invention

The present invention makes it possible to test the detection sensitivity of the CO detector more easily than conventional art.

FUNDAMENTAL FINDINGS

The inventors of the present invention conducted diligent studies regarding a CO detector to be included in a hydrogen generation apparatus or fuel cell system, in order to make it possible to test the CO detector's detection sensitivity more easily than conventional art. As a result of the studies, the inventors have obtained findings as described below.

Specifically, the inventors of the present invention came up with an idea that the detection sensitivity of the CO detector can be tested more easily than conventional art by confirming an output value from the CO detector when the CO concentration in a flue gas is increased.

The CO concentration in the flue gas can be increased by decreasing the air ratio in a combustor. However, the inventors of the present invention have adopted the following manner of testing the detection sensitivity of the CO detector: test the detection sensitivity of the CO detector when the air ratio in the combustor is increased in such a manner as to increase the CO concentration in the flue gas. The reason for adopting such manner of testing is described below.

Figure 22:
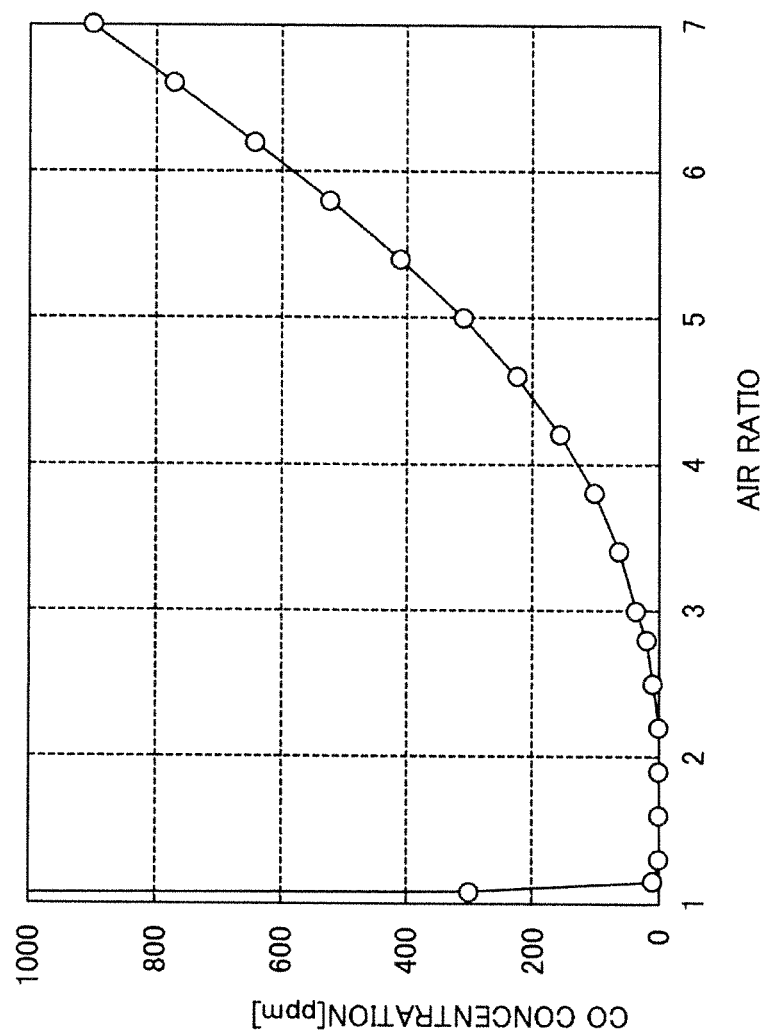
FIG. 22 is a graph showing results of measurement of the CO concentration in a flue gas, the measurement being performed when the air ratio in a combustor was varied.

FIG. 22 is a graph showing results of measurement of the CO concentration in the flue gas. The measurement was performed when the air ratio in the combustor was varied.

As shown in FIG. 22, in a hydrogen generation apparatus, in the case of increasing the CO concentration in the flue gas by decreasing the air ratio in the combustor, the CO concentration increases rapidly relative to the amount of decrease in the air ratio. Therefore, in the case of increasing the CO concentration in the flue gas by decreasing the air ratio, it is technically very difficult to perform the control in such a manner as not to cause an excessive increase in the concentration of CO generated in the combustor.

On the other hand, as shown in FIG. 22, in the case of increasing the CO concentration by increasing the air ratio in the combustor in the hydrogen generation apparatus, the CO concentration increases more gradually than in the case of increasing the CO concentration by decreasing the air ratio. Therefore, in order to perform the control in such a manner as not to cause an excessive increase in the concentration of CO generated in the combustor, the control based on increasing the CO concentration by increasing the air ratio is technically easier than the control based on increasing the CO concentration by decreasing the air ratio.

In the case where the air ratio in the combustor is increased, soot deposition in a flue gas passage is less than in the case where the air ratio in the combustor is decreased. Therefore, negative influence on the combustor can be reduced in the case where the air ratio in the combustor is increased. The reason for this is described below.

First, when the amount of air supplied to the combustor is increased in order to increase the air ratio in the combustor, the flow rate of the flue gas discharged from the combustor increases. As a result, generated soot is quickly discharged from the flue gas passage. When the amount of fuel supplied to the combustor is decreased in order to increase the air ratio in the combustor, the amount of soot and smoke to be generated decreases.

On the other hand, when the amount of air supplied to the combustor is decreased in order to decrease the air ratio in the combustor, the flow rate of the flue gas discharged from the combustor decreases. As a result, soot is not smoothly discharged from the flue gas passage. When the amount of fuel supplied to the combustor is increased in order to decrease the air ratio in the combustor, the amount of soot and smoke to be generated increases.

Hereinafter, embodiments of the present invention are described with reference to the drawings. In the drawings, the same or corresponding components are denoted by the same reference signs, and repeating the same descriptions is avoided. In the drawings, in some cases, only the components necessary for describing the present invention are shown and the other components are omitted. Further, the present invention is not limited to the embodiments described below.

Embodiment 1

A hydrogen generation apparatus according to Embodiment 1 includes: a reformer configured to generate a hydrogen-containing gas through a reforming reaction; a combustor configured to heat the reformer; an air supply device configured to supply air to the combustor; a fuel supply device configured to supply a fuel to the combustor; a CO detector configured to detect a carbon monoxide concentration in a flue gas discharged from the combustor; and a controller configured to control at least one of the air supply device and the fuel supply device to increase an air ratio in the combustor such that the CO concentration (carbon monoxide concentration) in the flue gas increases, and then test the CO detector for abnormality.

According to the above configuration, compared to conventional hydrogen generation apparatuses, the detection sensitivity of the CO detector can be tested more easily. In addition, a possibility that the CO concentration increases excessively can be reduced compared to a case where the CO concentration is increased by decreasing the air ratio.

[Configuration of Hydrogen Generation Apparatus]

Figure 1:
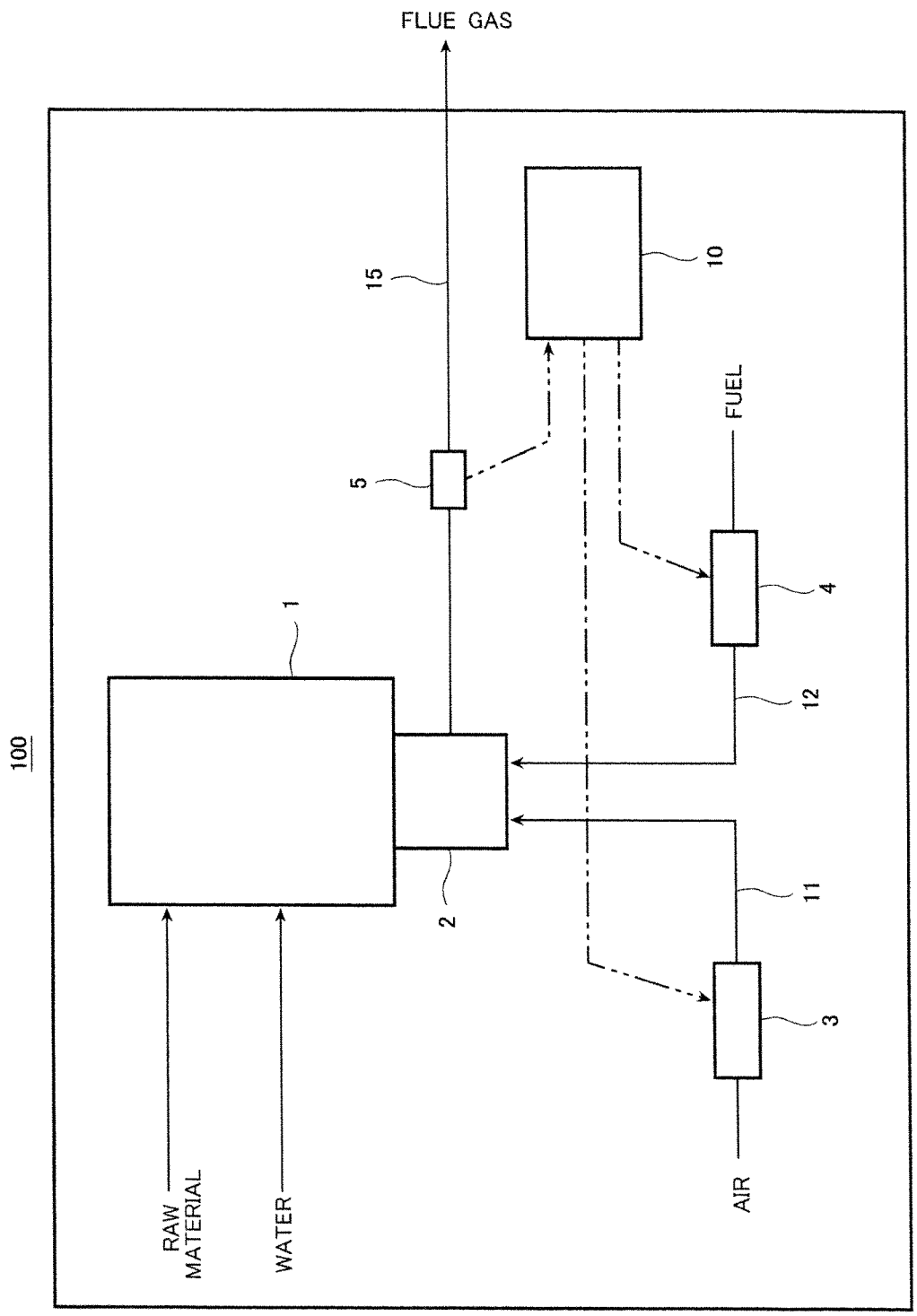
FIG. 1 is a schematic diagram showing one example of a schematic configuration of a hydrogen generation apparatus according to Embodiment 1.

FIG. 1 is a schematic diagram showing one example of a schematic configuration of the hydrogen generation apparatus according to Embodiment 1.

In the example shown in FIG. 1, a hydrogen generation apparatus 100 according to the present embodiment includes a reformer 1, a combustor 2, an air supply device 3, a fuel supply device 4, a CO detector 5, and a controller 10.

The reformer 1 is configured to generate a hydrogen-containing gas through a reforming reaction by using a raw material and steam. Specifically, the reforming reaction of the raw material is catalyzed by a reforming catalyst (not shown) in the reformer 1, and thereby the hydrogen-containing gas is generated. The reforming reaction may be any type of reforming reaction. Examples of the reforming reaction include a steam reforming reaction, an autothermal reaction, and a partial oxidation reaction.

It should be noted that an organic compound comprised of at least carbon and hydrogen, such as natural gas containing methane as a main component, LPG, alcohol, gasoline, or kerosene, may be used as the raw material. The raw material is supplied from a raw material source (not shown). Examples of the raw material source include a raw material gas cylinder, a raw material gas infrastructure, and a raw material tank. Water used herein may be tap water, for example. The water may be supplied from tap water piping, for example.

The hydrogen generation apparatus 100 includes, as necessary, devices required for the reforming reaction although they are not shown in FIG. 1. For example, if the reforming reaction is a steam reforming reaction, the hydrogen generation apparatus 100 includes an evaporator configured to generate steam. If the reforming reaction is an autothermal reaction, the hydrogen generation apparatus 100 further includes an air supply device (not shown) configured to supply air to the reformer.

The hydrogen-containing gas generated by the reformer 1 is supplied to hydrogen utilizing equipment (not shown) through a suitable passage. Examples of the hydrogen utilizing equipment include a hydrogen tank and a fuel cell.

The combustor 2 is configured to combust a fuel and air supplied to the combustor 2, thereby heating the reformer 1. A burner may be used as the combustor 2, for example. The air supply device 3 is connected to the combustor 2 via an air supply passage 11. The air supply device 3 may be configured in any form, so long as the air supply device 3 is configured to supply air to the combustor 2. A fan, blower, or the like may be used as the air supply device 3, for example.

The fuel supply device 4 is connected to the combustor 2 via a fuel supply passage 12. The fuel supply device 4 may be configured in any form, so long as the fuel supply device 4 is configured to supply the fuel to the combustor 2. For example, a raw material supply device, which is not shown, may serve as the fuel supply device 4. The fuel supply device 4 adjusts the flow rate of the fuel supplied to the combustor 2. For example, the fuel supply device 4 may be constituted by a booster and a flow rate adjusting valve. The booster is a fixed displacement pump, for example. However, the booster is not limited to a fixed displacement pump.

It should be noted that natural gas, LPG, gasoline, naphtha, kerosene, light oil, etc., may be used as the fuel. The fuel is supplied from a fuel supply source. Examples of the fuel supply source include a fuel gas cylinder, a fuel gas infrastructure, and a fuel tank. The fuel supply device may be constituted by either a booster or a flow rate adjusting valve.

In the case of using a raw material supply device as the fuel supply device 4, the configuration may be made such that, at start-up of the hydrogen generation apparatus 100, the raw material that has passed through the reformer 1 is supplied to the combustor 2, or the raw material that has bypassed the reformer 1 is supplied to the combustor 2.

As described below, in the case of adopting a configuration in which the combustor 2 is supplied with the hydrogen-containing gas generated by the reformer 1, the fuel supply device 4 includes a raw material supply device, a steam supply device (including a water supply device and an evaporator), and the reformer 1. Moreover, in the case of adopting a configuration in which the hydrogen utilizing equipment is a fuel cell, and the hydrogen-containing gas that has not been used by the fuel cell during a power generation operation of the fuel cell is supplied to the combustor 2, the fuel supply device 4 includes a raw material supply device, a steam supply device, the reformer 1, and the fuel cell.

A flue gas passage 15, through which a flue gas generated as a result of the combustion by the combustor 2 flows, is connected to the combustor 2. The CO detector 5 is provided on the flue gas passage 15. The CO detector 5 is configured to detect the carbon monoxide concentration in the flue gas, and output the detected carbon monoxide concentration to the controller 10. For example, a catalytic combustion type CO sensor or a semiconductor type CO sensor may be used as the CO detector 5. It should be noted that the CO detector 5 may be provided on a passage that branches off from the flue gas passage 15.

The controller 10 controls at least one of the air supply device 3 and the fuel supply device 4 to increase the air ratio in the combustor 2 such that the CO concentration in the flue gas increases, and then tests the CO detector 5 for abnormality (i.e., tests the detection sensitivity). The term air ratio herein refers to the ratio of an actual amount of air usage to the theoretical air requirement necessary for perfect combustion of the fuel.

The controller 10 may be any controller, so long as the controller is configured to control devices that are required to operate when performing the abnormality test (e.g., the air supply device 3). The controller 10 includes an arithmetic processing unit and a storage unit (which are not shown). The storage unit stores control programs. Examples of the arithmetic processing unit include an MPU and a CPU. The storage unit is a memory, for example. It should be noted that the controller 10 may be configured as a single controller performing centralized control, or may be configured as a group of multiple controllers performing distributed control in cooperation with each other.

[Operations of Hydrogen Generation Apparatus]

Hereinafter, operations of the hydrogen generation apparatus 100 according to Embodiment 1 are described with reference to FIG. 1 and FIG. 2. It should be noted that a hydrogen generation operation of the hydrogen generation apparatus 100 is performed in the same manner as a hydrogen generation operation of a known hydrogen generation apparatus. Therefore, a detailed description of the hydrogen generation operation is omitted below. The description below describes the abnormality test of testing the CO detector 5 for abnormality. The abnormality test is performed based on a control program stored in the storage unit at a desired timing when the combustor 2 is in the state of steady combustion. Preferably, the abnormality test is performed when increase and decrease in the amount of fuel and air supplied to the combustor 2 are small, for example, during steady operation of the hydrogen generation apparatus 100.

Figure 2:
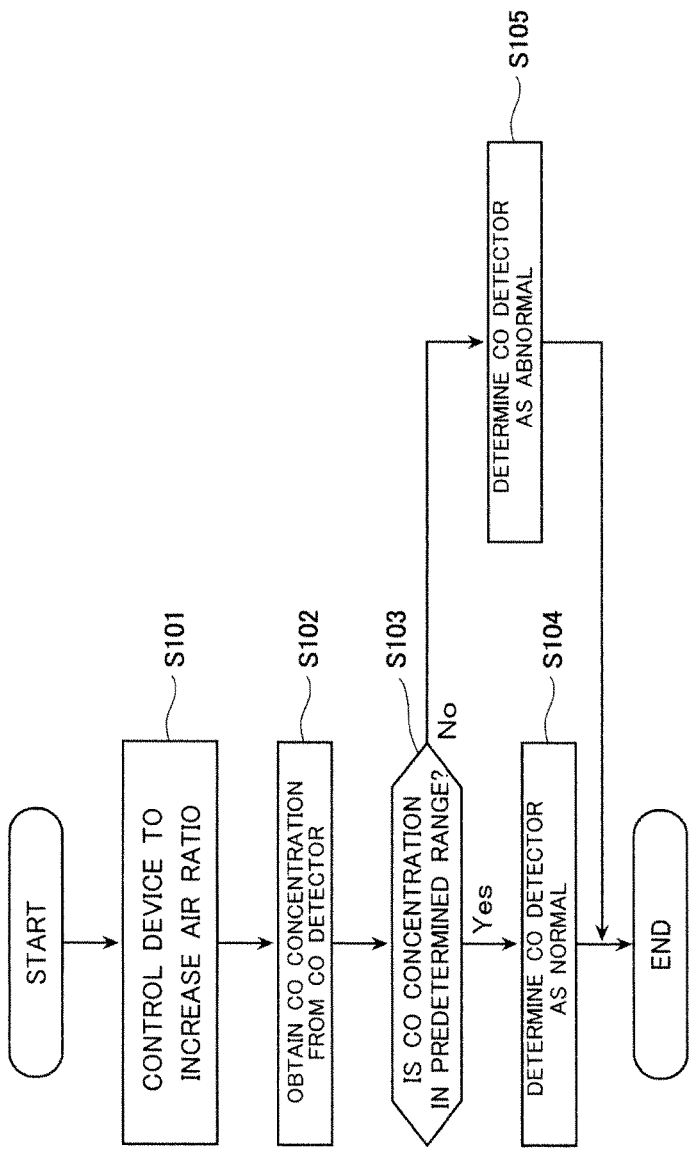
FIG. 2 is a flowchart showing one example of schematic operations of the hydrogen generation apparatus according to Embodiment 1.

FIG. 2 is a flowchart showing one example of schematic operations of the hydrogen generation apparatus according to Embodiment 1.

As shown in FIG. 2, the controller 10 controls at least one of the air supply device 3 and the fuel supply device 4 to increase the air ratio in the combustor 2 such that the CO concentration in the flue gas increases (step S101).

Specifically, for example, the controller 10 controls at least one of the air supply device 3 and the fuel supply device 4 such that the air ratio in the combustor 2 becomes 4 to 6. To be more specific, the controller 10 controls the air supply device 3 so as to increase the flow rate of the air supplied to the combustor 2, or the controller 10 controls the fuel supply device 4 so as to decrease the flow rate of the fuel supplied to the combustor 2. As a result, a flue gas with a high CO concentration is generated in the combustor 2.

Next, the controller 10 obtains, from the CO detector 5, a carbon monoxide concentration detected by the CO detector 5 (step S102). Then, the controller 10 determines whether the carbon monoxide concentration obtained in step S102 is in a predetermined range (step S103). The predetermined range is pre-stored in a storage device of the controller 10, and is set as desired within the range of the detection sensitivity of the CO detector 5. The predetermined range herein may be, for example, no less than 100 ppm and no more than 2400 ppm. That is, the predetermined range may be such that the lower limit value=100 ppm and the upper limit value=2400 ppm. Alternatively, the upper limit value of the predetermined range may be 500 ppm.

If it is determined that the carbon monoxide concentration obtained in step S102 is in the predetermined range (Yes in step S103), the controller 10 determines that the detection sensitivity of the CO detector 5 is normal (step S104), and ends the abnormality test. If it is determined that the carbon monoxide concentration obtained in step S102 is not in the predetermined range (No in step S103), the controller 10 determines that the detection sensitivity of the CO detector 5 is abnormal (step S104), and ends the abnormality test.

Embodiment 2

A hydrogen generation apparatus according to Embodiment 2 is configured such that, in the hydrogen generation apparatus according to Embodiment 1, if the controller determines that there is an abnormality in the CO detector, the controller stops the hydrogen generation apparatus from operating. It should be noted that, other than the above feature, the configuration of the hydrogen generation apparatus according to the present embodiment may be the same as the configuration of the hydrogen generation apparatus according to Embodiment 1.

According to the above configuration, compared to conventional hydrogen generation apparatuses, the detection sensitivity of the CO detector can be tested more easily. Moreover, after it is determined that there is an abnormality, the operation of the hydrogen generation apparatus is not continued. As a result, the occurrence of a situation where the operation of the hydrogen generation apparatus continues even though the detection sensitivity of the CO detector is abnormal is suppressed, which makes it possible to improve safety compared to conventional hydrogen generation apparatuses. Furthermore, a possibility that the CO concentration increases excessively can be reduced compared to a case where the CO concentration is increased by decreasing the air ratio.

It should be noted that since the configuration of the hydrogen generation apparatus according to Embodiment 2 is the same as the configuration of the hydrogen generation apparatus according to Embodiment 1, the description below describes the abnormality test of the CO detector.

Figure 3:
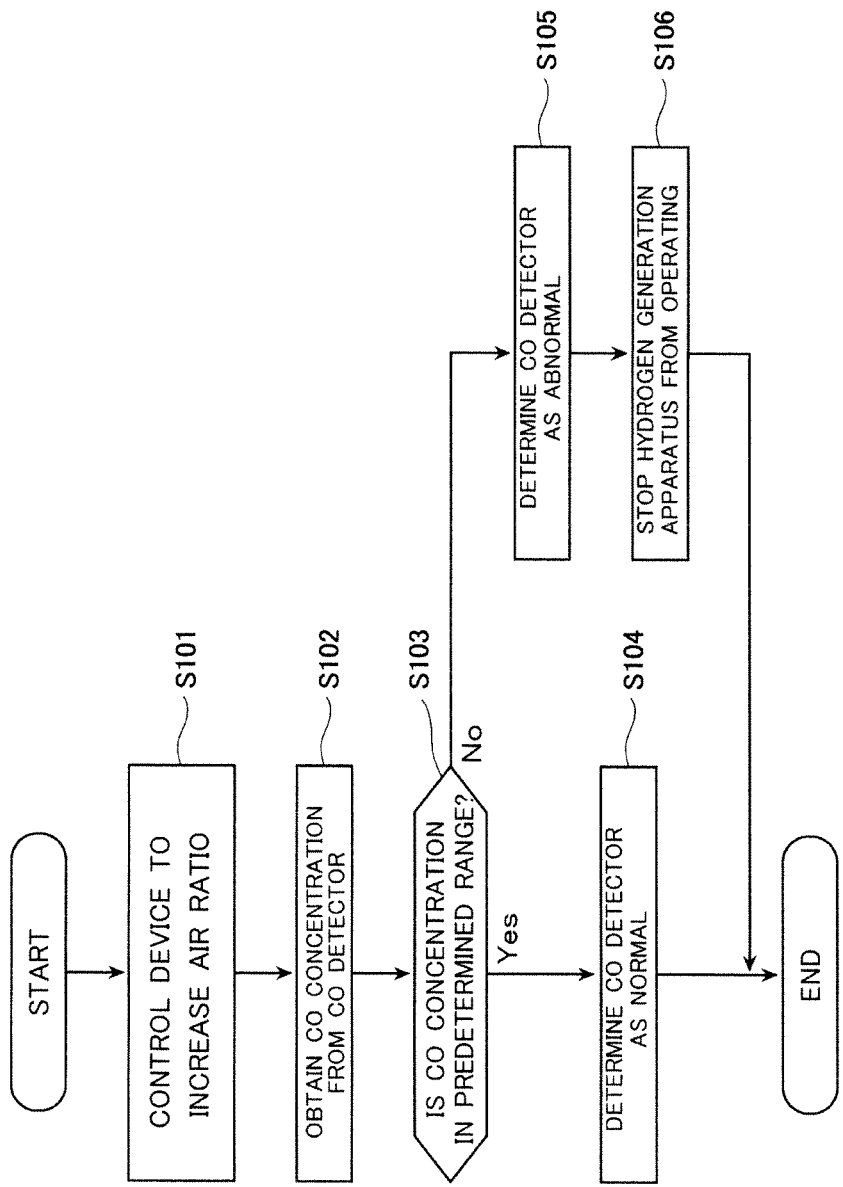
FIG. 3 is a flowchart showing one example of schematic operations of a hydrogen generation apparatus according to Embodiment 2.

FIG. 3 is a flowchart showing one example of schematic operations of the hydrogen generation apparatus according to Embodiment 2.

As shown in FIG. 3, the schematic operations of the hydrogen generation apparatus according to Embodiment 2 are fundamentally the same as the schematic operations of the hydrogen generation apparatus according to Embodiment 1. However, the operations of the hydrogen generation apparatus according to Embodiment 2 are different from the operations of the hydrogen generation apparatus according to Embodiment 1 in that, in Embodiment 2, after it is determined in step S105 that the detection sensitivity of the CO detector 5 is abnormal, the controller 10 stops the hydrogen generation apparatus 100 from operating (step S106).

Embodiment 3

A hydrogen generation apparatus according to Embodiment 3 is configured such that, in the hydrogen generation apparatus according to Embodiment 2, if the controller determines that there is an abnormality in the CO detector, the controller prohibits restart of the hydrogen generation apparatus.

According to the above configuration, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. Furthermore, after it is determined that there is an abnormality, the operation of the hydrogen generation apparatus is not continued. As a result, the occurrence of a situation where the hydrogen generation apparatus is operated even though the detection sensitivity of the CO detector is abnormal is suppressed, which makes it possible to improve safety compared to conventional hydrogen generation apparatuses.

It should be noted that since the configuration of the hydrogen generation apparatus according to Embodiment 3 is the same as the configuration of the hydrogen generation apparatus according to Embodiment 1, the description below describes the abnormality test of the CO detector.

Figure 4:
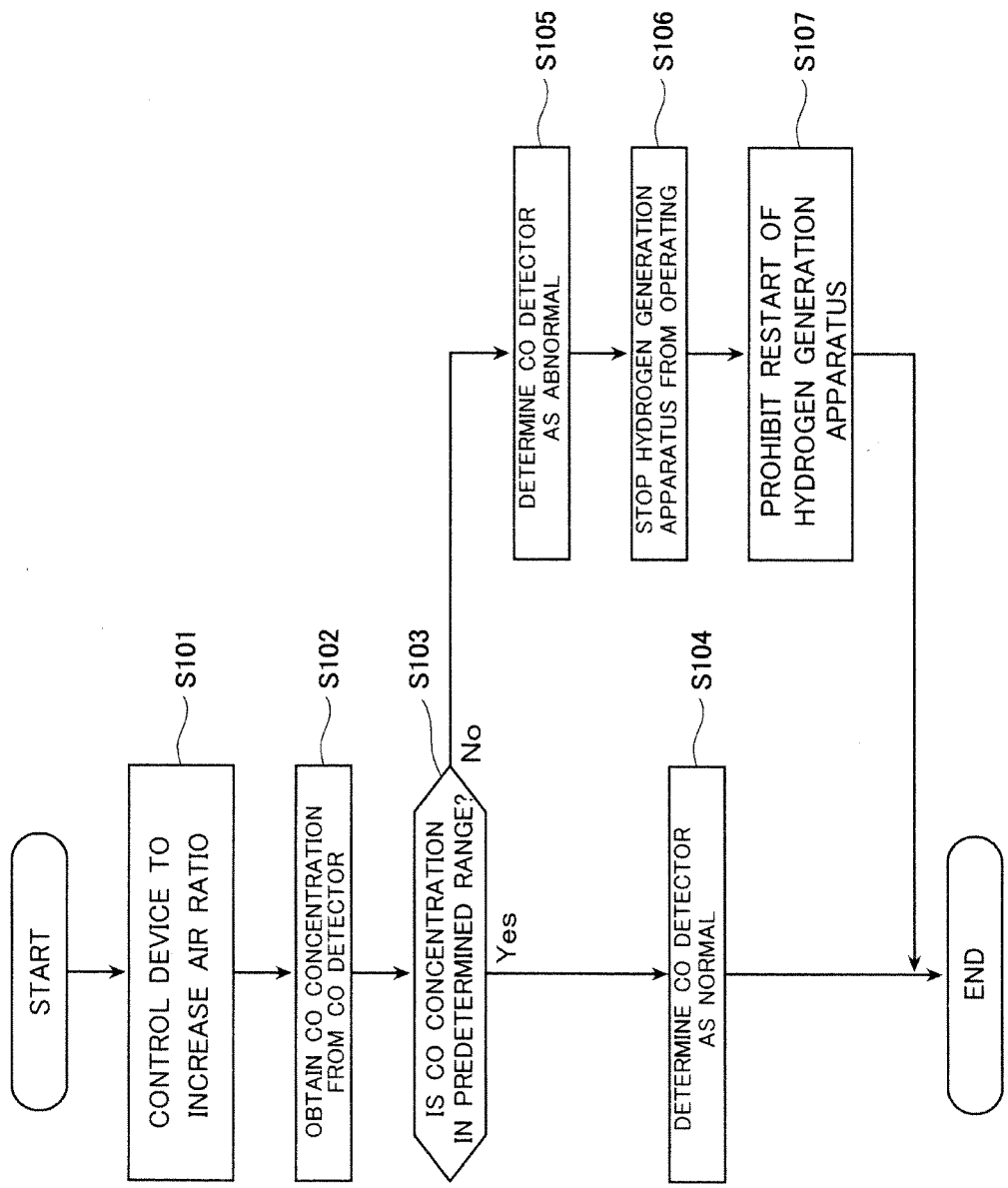
FIG. 4 is a flowchart showing one example of schematic operations of a hydrogen generation apparatus according to Embodiment 3.

FIG. 4 is a flowchart showing one example of schematic operations of the hydrogen generation apparatus according to Embodiment 3.

As shown in FIG. 4, the schematic operations of the hydrogen generation apparatus according to Embodiment 3 are fundamentally the same as the schematic operations of the hydrogen generation apparatus according to Embodiment 2. However, the operations of the hydrogen generation apparatus according to Embodiment 3 are different from the operations of the hydrogen generation apparatus according to Embodiment 2 in that, in Embodiment 3, after stopping the hydrogen generation apparatus 100 from operating in step S106, the controller 10 prohibits restart of the hydrogen generation apparatus 100 (step S107).

It should be noted that in a case where restart of the hydrogen generation apparatus 100 is prohibited, even if, for example, a command to start up the hydrogen generation apparatus 100 is inputted to the controller 10 from the outside, the controller 10 will not start up the hydrogen generation apparatus 100. Another example is that even if a preset start-up time for the hydrogen generation apparatus 100 has arrived, the controller 10 will not start up the hydrogen generation apparatus 100.

Embodiment 4

A hydrogen generation apparatus according to Embodiment 4 is configured such that the hydrogen generation apparatus according to any one of Embodiments 1 to 3 further includes a notification device configured to give a notification that there is an abnormality in the CO detector. It should be noted that, other than the above feature, the configuration of the hydrogen generation apparatus according to the present embodiment may be the same as the configuration of the hydrogen generation apparatus according to any one of Embodiments 1 to 3.

According to the above configuration, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. Furthermore, since the notification device gives a notification that there is an abnormality in the CO detector, safety can be improved compared to conventional hydrogen generation apparatuses.

[Configuration of Hydrogen Generation Apparatus]

Figure 5:
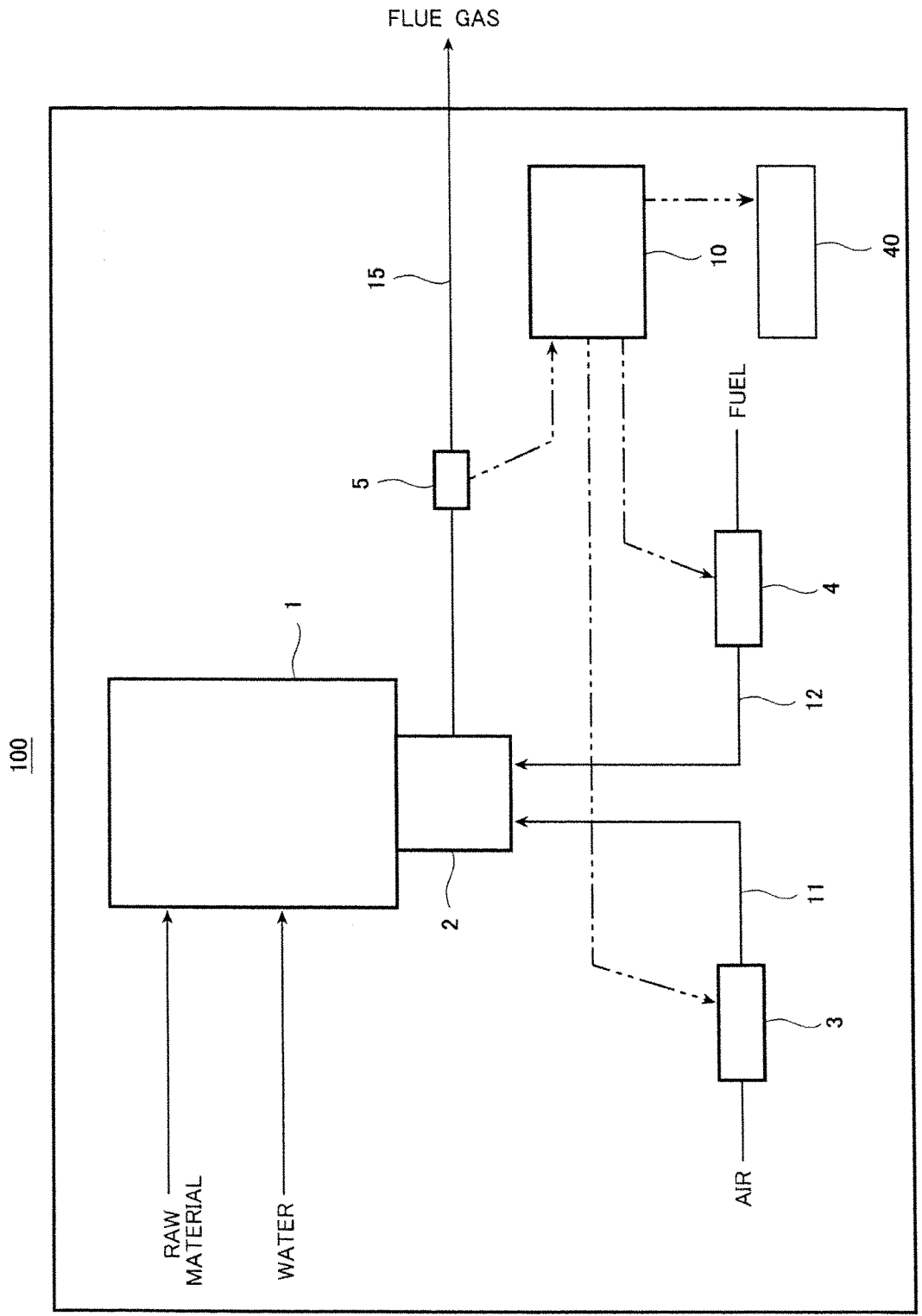
FIG. 5 is a schematic diagram showing one example of a schematic configuration of a hydrogen generation apparatus according to Embodiment 4.

FIG. 5 is a schematic diagram showing one example of a schematic configuration of the hydrogen generation apparatus according to Embodiment 4.

In the example shown in FIG. 5, the fundamental configuration of the hydrogen generation apparatus 100 according to the present embodiment is the same as that of the hydrogen generation apparatus 100 according to Embodiment 1. However, the hydrogen generation apparatus 100 according to the present embodiment is different from the hydrogen generation apparatus 100 according to Embodiment 1, in that the hydrogen generation apparatus 100 according to the present embodiment includes a notification device 40.

The notification device 40 may be configured in any form, so long as the notification device 40 is configured to give a notification to the outside that there is an abnormality in the CO detector 5. Examples of the manner of giving a notification to the outside include: displaying character data, image data, or the like on a display unit (screen) of a remote controller; giving an audio notification by means of a speaker or the like; giving a notification by emitting light or showing a color; and sending an email notification or an application notification to a smartphone, mobile phone, tablet computer, or the like through a communication network.

[Operations of Hydrogen Generation Apparatus]

Figure 6:
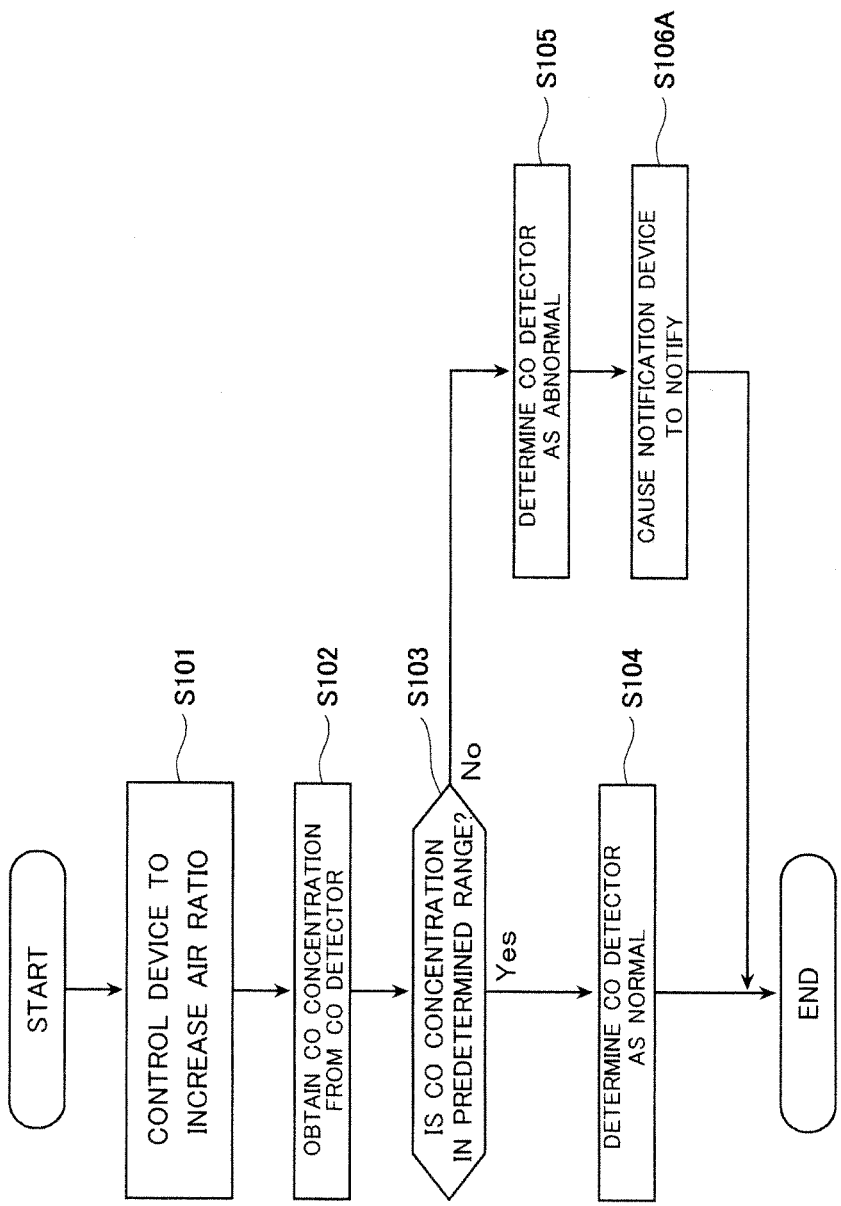
FIG. 6 is a flowchart showing one example of schematic operations of the hydrogen generation apparatus according to Embodiment 4.

FIG. 6 is a flowchart showing one example of schematic operations of the hydrogen generation apparatus according to Embodiment 4.

As shown in FIG. 6, the schematic operations of the hydrogen generation apparatus according to Embodiment 4 are fundamentally the same as the schematic operations of the hydrogen generation apparatus according to Embodiment 2. However, the operations of the hydrogen generation apparatus according to Embodiment 4 are different from the operations of the hydrogen generation apparatus according to Embodiment 2 in that, in Embodiment 4, after it is determined that the detection sensitivity of the CO detector 5 is abnormal (step S105), the controller 10 causes the notification device 40 to give a notification that there is an abnormality in the CO detector 5 (step S106A).

It should be noted that the timing of causing the notification device 40 to give a notification may be after the hydrogen generation apparatus 100 is stopped from operating (i.e., after step S106), or may be after restart of the hydrogen generation apparatus 100 is prohibited (i.e., after step S107).

Embodiment 5

A hydrogen generation apparatus according to Embodiment 5 is configured such that, in the hydrogen generation apparatus according to any one of Embodiments 1 to 4, after testing the CO detector for abnormality, the controller controls at least one of the air supply device and the fuel supply device to decrease the air ratio in the combustor such that the CO concentration in the flue gas decreases. It should be noted that, other than the above feature, the configuration of the hydrogen generation apparatus according to the present embodiment may be the same as the configuration of the hydrogen generation apparatus according to any one of Embodiments 1 to 4.

According to the above configuration, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. Furthermore, safety can be improved compared to conventional hydrogen generation apparatuses.

It should be noted that since the configuration of the hydrogen generation apparatus according to Embodiment 5 is the same as the configuration of the hydrogen generation apparatus according to Embodiment 1, the description below describes the abnormality test of the CO detector.

Figure 7:
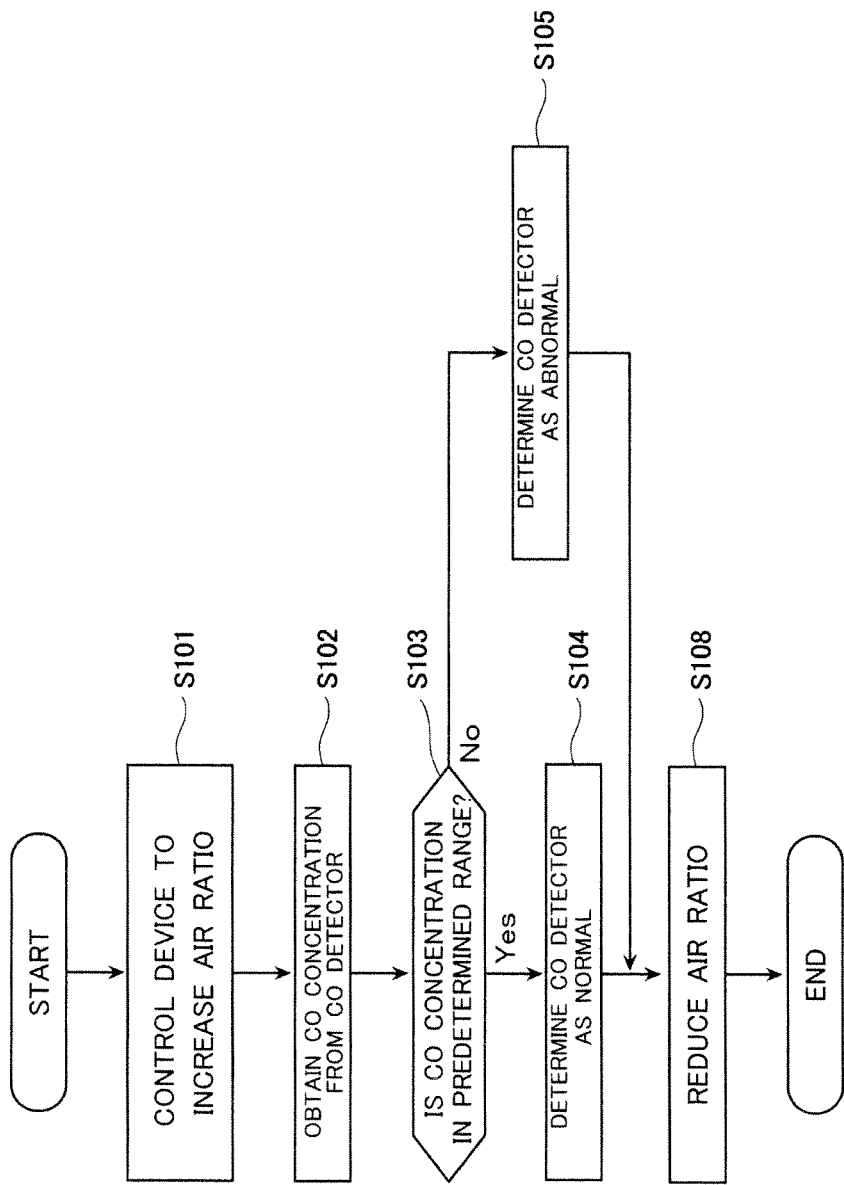
FIG. 7 is a flowchart showing one example of schematic operations of a hydrogen generation apparatus according to Embodiment 5.

FIG. 7 is a flowchart showing one example of schematic operations of the hydrogen generation apparatus according to Embodiment 5.

As shown in FIG. 7, the schematic operations of the hydrogen generation apparatus according to Embodiment 5 are fundamentally the same as the schematic operations of the hydrogen generation apparatus according to Embodiment 1. However, the operations of the hydrogen generation apparatus according to Embodiment 5 are different from the operations of the hydrogen generation apparatus according to Embodiment 1 in that, in Embodiment 5, after it is determined that the detection sensitivity of the CO detector 5 is normal or abnormal (i.e., after step S104 or step S105), the controller 10 controls at least one of the fuel supply device and the air supply device to decrease the air ratio in the combustor 2 such that the CO concentration in the flue gas decreases (step S108). That is, after performing the abnormality test of the CO detector 5, the controller 10 brings back the air ratio in the combustor 2 to a previous air ratio.

Specifically, after performing the abnormality test of the CO detector 5, the controller 10 controls at least one of the fuel supply device and the air supply device, such that the air ratio in the combustor 2 becomes the air ratio at a point before the air ratio in the combustor 2 was increased in step S101 (e.g., the air ratio in the range of 1.5 to 3.2). This makes it possible to suppress the continuance of a state where the flue gas with a high carbon monoxide concentration is discharged.

Embodiment 6

A hydrogen generation apparatus according to Embodiment 6 is configured such that, in the hydrogen generation apparatus according to Embodiment 5, after a predetermined time has elapsed, at least one of the fuel supply device and the air supply device is controlled so as to decrease the air ratio in the combustor.

Moreover, in the hydrogen generation apparatus according to Embodiment 6, after increasing the air ratio in the combustor such that the CO concentration in the flue gas increases, when a total amount of carbon monoxide in the flue gas discharged from the combustor has become greater than or equal to a first threshold, the controller may control at least one of the air supply device and the fuel supply device to decrease the air ratio in the combustor such that the CO concentration in the flue gas decreases.

Furthermore, in the hydrogen generation apparatus according to Embodiment 6, after increasing the air ratio in the combustor such that the CO concentration in the flue gas increases, when a value of a product of a highest CO concentration generatable by the combustor and a time has become greater than or equal to a second threshold, the controller may control at least one of the air supply device and the fuel supply device to decrease the air ratio in the combustor such that the CO concentration in the flue gas decreases.

According to the above configuration, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. Furthermore, safety can be improved compared to conventional hydrogen generation apparatuses.

The first threshold and the second threshold herein are set as thresholds for suppressing a negative influence of CO contained in the flue gas on a human body, and are suitably set based on, for example, the configuration of the hydrogen generation apparatus.

The total amount of carbon monoxide after increasing the air ratio, or the product of the highest CO concentration and the time, may be directly specified, or parameters correlated with these values may be specified. Such a parameter may be considered as a parameter that indirectly indicates the total amount of carbon monoxide after increasing the air ratio or indirectly indicates the product of the highest CO concentration and the time. Specifically, such a parameter may be, for example, a time that has elapsed after increasing the air ratio.

It should be noted that since the configuration of the hydrogen generation apparatus according to Embodiment 6 is the same as the configuration of the hydrogen generation apparatus according to Embodiment 5, the description below describes the abnormality test of the CO detector.

Figure 8:
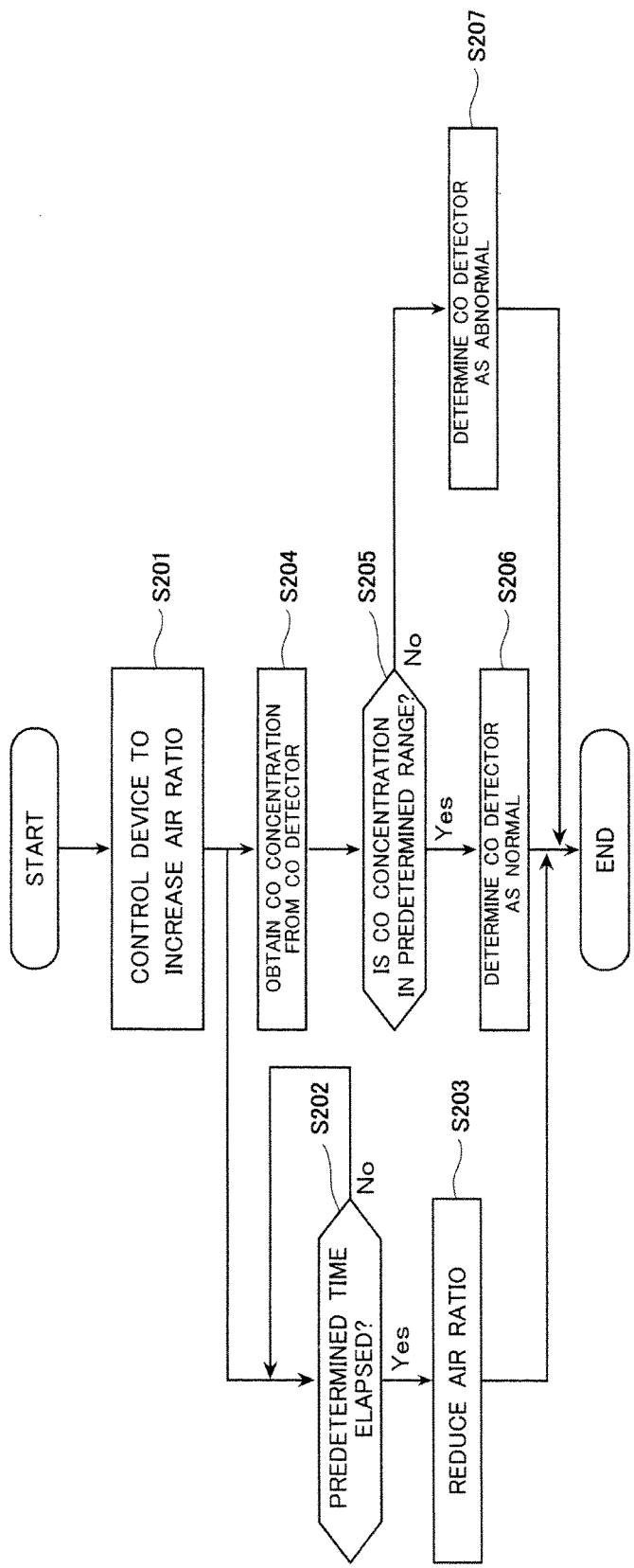
FIG. 8 is a flowchart showing one example of schematic operations of a hydrogen generation apparatus according to Embodiment 6.

FIG. 8 is a flowchart showing one example of schematic operations of the hydrogen generation apparatus according to Embodiment 6.

As shown in FIG. 8, the controller 10 controls at least one of the air supply device 3 and the fuel supply device 4 to increase the air ratio in the combustor 2 such that the CO concentration in the flue gas increases (step S201).

Next, the controller 10 measures a time that elapses after the air ratio is varied in step S201, and determines whether a predetermined time has elapsed (step S202). It should be noted that, as described below, the controller 10 performs steps S204 to S206 while performing step S202.

The predetermined time herein is suitably set as a value for suppressing a negative influence of CO contained in the flue gas on a human body, and is set to be longer than a time required for performing steps S204 to S206.

For example, the CO concentration in the flue gas when the air ratio is increased is estimated in advance through an experiment or the like, and the predetermined time may be set such that, from the viewpoint of influence on a human body, a ct value indicated as the product of a carbon monoxide concentration (ppm) and a time (hours) becomes less than 300 (a second predetermined value). The ct value less than 300 is a condition, in which c represents a CO concentration (ppm) and t represents an exposure time (hours) and under which an influence on a human body is considered small. For example, in a case where the maximum value of the concentration of carbon monoxide dischargeable from the combustor 2 is 3,000 ppm, the predetermined time may be set to six minutes.

Alternatively, the concentration of carbon monoxide generated in the combustor 2 when the air ratio in the combustor 2 is increased may be estimated in advance through an experiment or the like, and a time that does not cause a total amount of carbon monoxide (a total carbon monoxide concentration) in the flue gas to exceed a first predetermined value (e.g., 300 ppm) may be set as the predetermined time. It should be noted that the time can be measured by using a timer unit in the controller 10, which is not shown.

When the predetermined time has elapsed (Yes in step S202), the controller 10 controls at least one of the air supply device 3 and the fuel supply device 4, such that the air ratio in the combustor 2 becomes the air ratio at a point before the air ratio in the combustor 2 was varied in step S201 (step S203).

As mentioned above, the controller 10 performs steps S204 to S206, which are described below, before the predetermined time has elapsed. In step S204, the controller 10 obtains, from the CO detector 5, a carbon monoxide concentration detected by the CO detector 5. Then, the controller 10 determines whether the carbon monoxide concentration obtained in step S204 is in the predetermined range (step S205).

If it is determined that the carbon monoxide concentration obtained in step S204 is in the predetermined range (Yes in step S205), the controller 10 determines that the detection sensitivity of the CO detector 5 is normal (step S206), and ends the abnormality test. If it is determined that the carbon monoxide concentration obtained in step S204 is not in the predetermined range (No in step S205), the controller 10 determines that the detection sensitivity of the CO detector 5 is abnormal (step S207), and ends the abnormality test.

In the hydrogen generation apparatus 100 according to the present embodiment with the above-described configuration, the air ratio is brought back to a safe value when the predetermined time has elapsed. This makes it possible to suppress the continuance of a state where the flue gas with a high carbon monoxide concentration is discharged from the combustor 2. Therefore, according to the hydrogen generation apparatus 100 of the present embodiment, safety can be improved compared to the hydrogen generation apparatus 100 of Embodiment 5.

It should be noted that, in step S203 described above, the control is performed such that the air ratio in the combustor 2 is brought back to the air ratio at a point before the air ratio was increased in step S201. However, the control of the air ratio is not thus limited. The air ratio may be controlled to be any air ratio, so long as the air ratio is decreased such that the CO concentration in the flue gas decreases.

Embodiment 7

A hydrogen generation apparatus according to Embodiment 7 is configured such that, in the hydrogen generation apparatus according to any one of Embodiments 1 to 6, while the combustor is heating the reformer before the reformer starts generating the hydrogen-containing gas, the controller controls at least one of the air supply device and the fuel supply device to increase the air ratio in the combustor such that the CO concentration in the flue gas increases, and then tests the CO detector for abnormality. It should be noted that, other than the above feature, the configuration of the hydrogen generation apparatus according to the present embodiment may be the same as the configuration of the hydrogen generation apparatus according to any one of Embodiments 1 to 6.

According to the above configuration, compared to conventional hydrogen generation apparatuses, the detection sensitivity of the CO detector can be tested more easily. The concentration of combustible carbon compound in the fuel that is combusted by the combustor before the start of the generation of the hydrogen-containing gas is higher than the concentration of combustible carbon compound in the hydrogen-containing gas. Accordingly, when the air ratio is varied, the carbon monoxide concentration is easily increased. Therefore, by varying the air ratio, an abnormality in the CO detector can be readily detected. It should be noted that examples of the aforementioned carbon compound include hydrocarbons and alcohols.

Moreover, according to the above configuration, a possibility that the CO concentration increases excessively can be reduced compared to a case where the CO concentration is increased by decreasing the air ratio.

It should be noted that since the configuration of the hydrogen generation apparatus according to Embodiment 7 is the same as the configuration of the hydrogen generation apparatus according to Embodiment 1, the description below describes the abnormality test of the CO detector. In the hydrogen generation apparatus according to the present embodiment, the abnormality test of the CO detector is performed while the reformer is being heated by the combustor.

Figure 9:
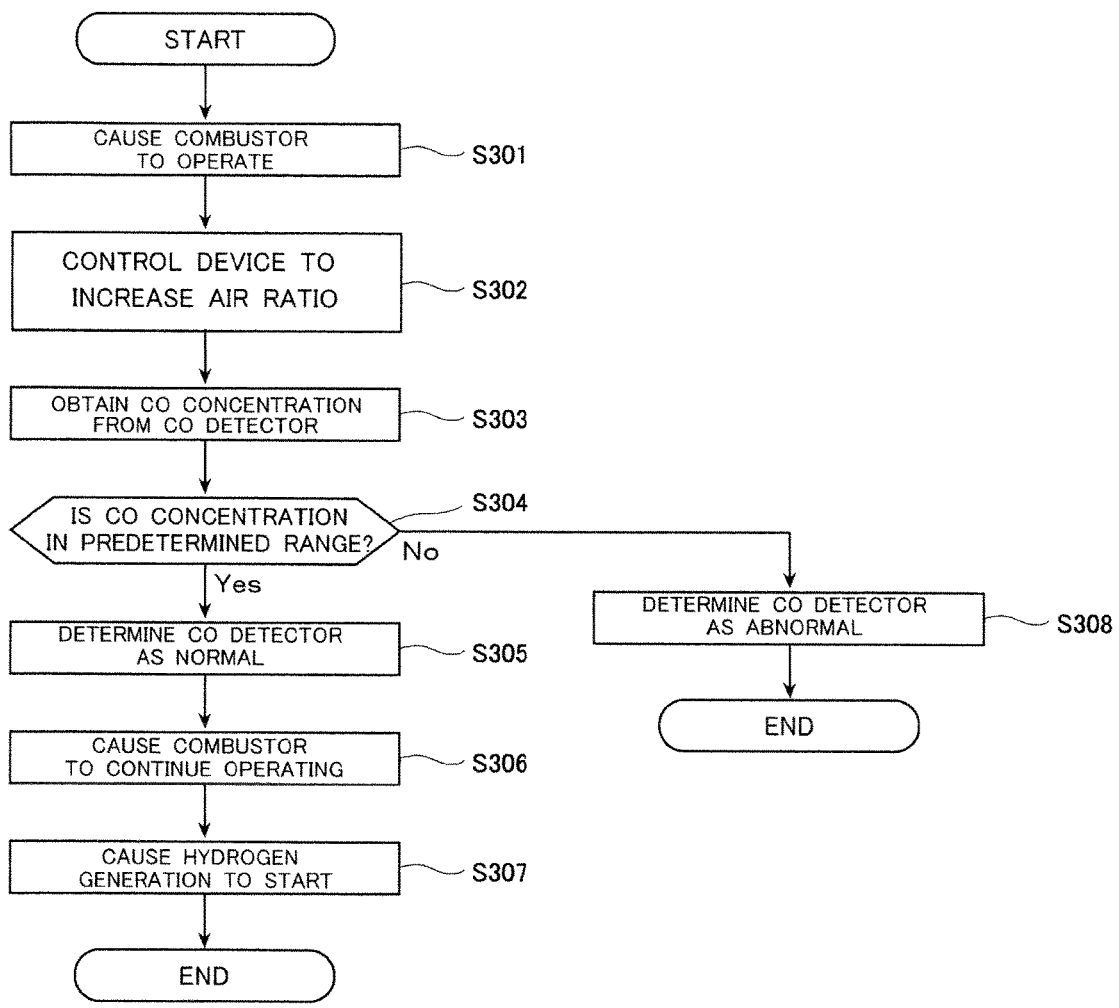
FIG. 9 is a flowchart showing one example of schematic operations of a hydrogen generation apparatus according to Embodiment 7.

FIG. 9 is a flowchart showing one example of schematic operations of the hydrogen generation apparatus according to Embodiment 7.

As shown in FIG. 9, the controller 10 causes the combustor 2 to operate (step S301). Specifically, the controller 10 causes the air supply device 3 and the fuel supply device 4 to operate to supply air and fuel to the combustor 2, and causes the combustor 2 to perform an ignition operation to start combustion. As a result, the reformer 1 is heated by heat that is transferred from the flue gas generated by the combustor 2.

Next, the controller 10 controls at least one of the air supply device 3 and the fuel supply device 4 to increase the air ratio in the combustor 2 such that the CO concentration in the flue gas increases (step S302). Then, the controller 10 obtains, from the CO detector 5, a carbon monoxide concentration detected by the CO detector 5 (step S303). Thereafter, the controller 10 determines whether the carbon monoxide concentration obtained in step S303 is in the predetermined range (step S304).

If it is determined that the carbon monoxide concentration obtained in step S303 is in the predetermined range (Yes in step S304), the controller 10 determines that the detection sensitivity of the CO detector 5 is normal (step S305).

Next, the controller 10 causes the combustor 2 to continue operating (step S306). At the time, the controller 10 may control at least one of the air supply device 3 and the fuel supply device 4, such that the air ratio in the combustor 2 becomes the air ratio at a point before the air ratio in the combustor 2 was increased in step S303.

Thereafter, when the temperature of the reformer 1 has become a predetermined temperature, the controller 10 performs control to supply the raw material and water to the reformer 1 to cause the reforming reaction, thereby causing hydrogen generation to start (step S307). Then, the controller 10 ends the flow.

On the other hand, if it is determined that the carbon monoxide concentration obtained in step S303 is not in the predetermined range (No in step S304), the controller 10 determines that the detection sensitivity of the CO detector 5 is abnormal (step S308), and ends the flow.

Embodiment 8

A hydrogen generation apparatus according to Embodiment 8 is configured such that, in the hydrogen generation apparatus according to any one of Embodiments 1 to 7, the controller tests the CO detector for abnormality when an amount of raw material relative to steam in the reformer is less than that during generation of the hydrogen-containing gas.

In the hydrogen generation apparatus according to Embodiment 8, the controller may test the CO detector for abnormality after stopping supply of the raw material to the reformer and purging an interior of the reformer with the steam. It should be noted that, other than the above features, the configuration of the hydrogen generation apparatus according to the present embodiment may be the same as the configuration of the hydrogen generation apparatus according to any one of Embodiments 1 to 7.

According to the above configuration, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. Even if the temperature of the reformer increases during the abnormality test of the CO detector, since the amount of raw material relative to steam in the reformer during the abnormality test is less than that during the generation of the hydrogen-containing gas, the occurrence of carbon deposition in the reformer can be suppressed compared to a case where the amount of raw material relative to steam in the reformer during the abnormality test is the same as that during the generation of the hydrogen-containing gas.

It should be noted that since the configuration of the hydrogen generation apparatus according to Embodiment 8 is the same as the configuration of the hydrogen generation apparatus according to Embodiment 1, the description below describes the abnormality test of the CO detector. A stop process (stop operation; stop step) of the hydrogen generation apparatus according to Embodiment 8 is performed in the same manner as a stop process of a known hydrogen generation apparatus. Therefore, a detailed description of the stop process is omitted.

Figure 10:
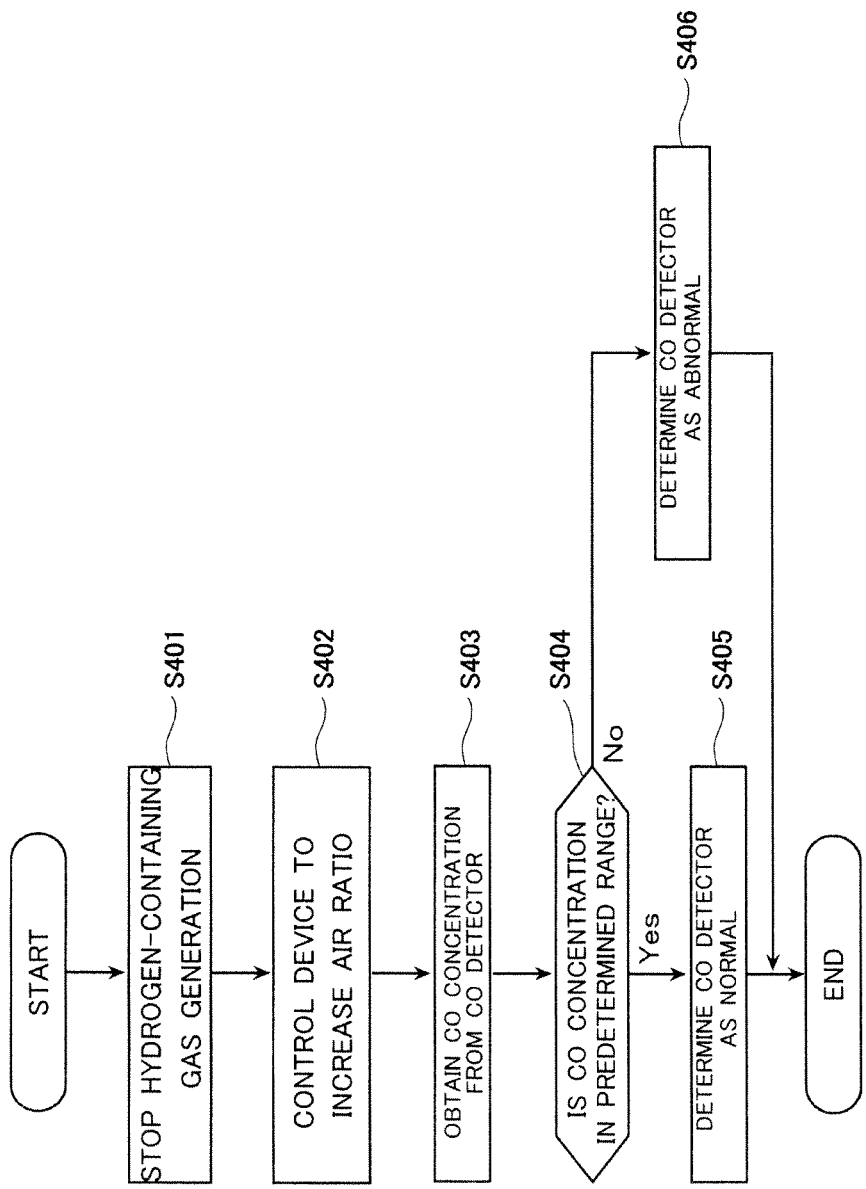
FIG. 10 is a flowchart showing one example of schematic operations of a hydrogen generation apparatus according to Embodiment 8.

FIG. 10 is a flowchart showing one example of schematic operations of the hydrogen generation apparatus according to Embodiment 8.

First, assume that, in the hydrogen generation apparatus 100, the reformer 1 is being supplied with the raw material and steam, and is generating the hydrogen-containing gas, and that an operation stop signal for the hydrogen generation apparatus 100 has been inputted to the controller 10.

It should be noted that examples of a case where the operation stop signal is inputted to the controller 10 include: a case where a user or the like operates a remote controller or the like to stop the hydrogen generation apparatus 100 from operating; a case where an operation stop time for the hydrogen generation apparatus 100 has arrived; and a case where an abnormality has occurred in a device included in the hydrogen generation apparatus 100.

As shown in FIG. 10, when an operation stop signal for the hydrogen generation apparatus 100 is inputted (START), the controller 10 stops the reformer 1 from generating the hydrogen-containing gas (step S401). Specifically, the controller 10 stops the supply of the raw material to the reformer 1, and stops the supply of water from the water supply device to the evaporator. As a result, steam is generated from residual water in the evaporator due to residual heat of the evaporator, and the reformer 1 is continuously supplied with the steam. Consequently, the amount of raw material relative to steam in the reformer 1 becomes less than that during the generation of the hydrogen-containing gas.

When the amount of raw material relative to steam in the reformer 1 is less than that during the generation of the hydrogen-containing gas, the controller 10 controls at least one of the air supply device 3 and the fuel supply device 4 to increase the air ratio in the combustor 2 such that the CO concentration in the flue gas increases (step S402). Then, the controller 10 obtains, from the CO detector 5, a carbon monoxide concentration detected by the CO detector 5 (step S403). Thereafter, the controller 10 determines whether the carbon monoxide concentration obtained in step S403 is in the predetermined range (step S404).

If it is determined that the carbon monoxide concentration obtained in step S403 is in the predetermined range (Yes in step S404), the controller 10 determines that the detection sensitivity of the CO detector 5 is normal (step S405), and ends the flow.

On the other hand, if it is determined that the carbon monoxide concentration obtained in step S403 is not in the predetermined range (No in step S404), the controller 10 determines that the detection sensitivity of the CO detector 5 is abnormal (step S406), and ends the flow.

It should be noted that the present embodiment is configured such that the reformer 1 is supplied with the steam that is generated from residual water in the evaporator due to residual heat of the evaporator, and thereby before the abnormality test is performed, the amount of raw material relative to steam in the reformer 1 becomes less than that during the generation of the hydrogen-containing gas. However, the present embodiment is not limited to this configuration. The present embodiment may adopt any configuration, so long as the amount of raw material relative to steam in the reformer 1 during the abnormality test is less than that during the generation of the hydrogen-containing gas. For example, before the abnormality test, the steam supply device may supply steam to the reformer 1 until the interior of the reformer 1 is purged with the steam.

Embodiment 9

A hydrogen generation apparatus according to Embodiment 9 is configured such that, in the hydrogen generation apparatus according to any one of Embodiments 1 to 8, the controller tests the CO detector for abnormality when an amount of raw material relative to steam in the reformer is greater than that during generation of the hydrogen-containing gas and a temperature in the reformer is a temperature that does not cause carbon deposition. It should be noted that, other than the above feature, the configuration of the hydrogen generation apparatus according to the present embodiment may be the same as the configuration of the hydrogen generation apparatus according to any one of Embodiments 1 to 8.

It should be noted that the controller may test the CO detector for abnormality after stopping the reformer from generating the hydrogen-containing gas. Moreover, after stopping the reformer from generating the hydrogen-containing gas, the controller may test the CO detector for abnormality when purging an interior of the reformer with the raw material.

According to the above configurations, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. If the temperature of the reformer increases during the abnormality test of the CO detector when the amount of raw material relative to steam in the reformer is greater than that during the generation of the hydrogen-containing gas, then carbon deposition tends to occur in the reformer. However, the above-described configuration makes it possible to suppress the occurrence of carbon deposition in the reformer.

[Configuration of Hydrogen Generation Apparatus]

Figure 11:
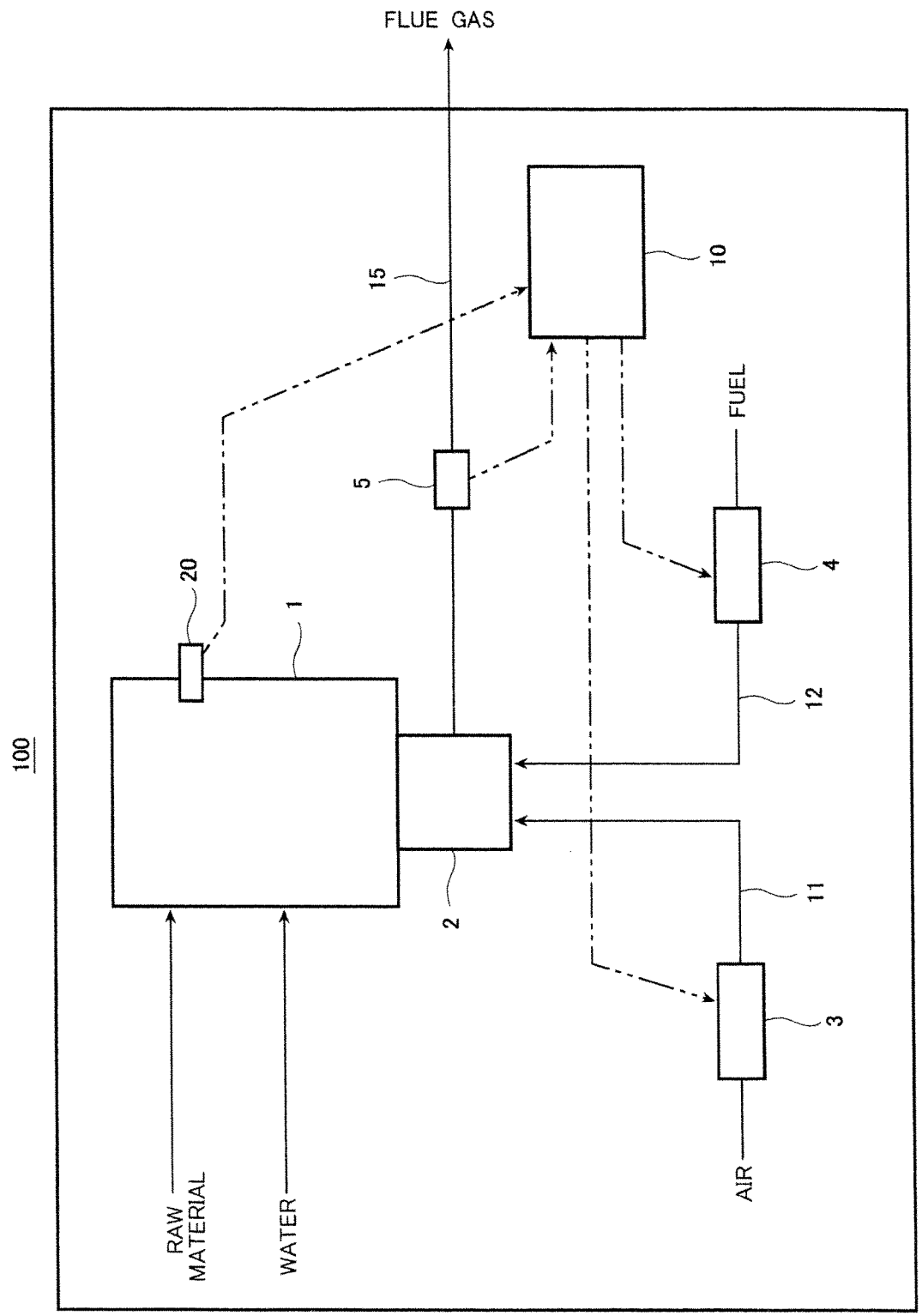
FIG. 11 is a schematic diagram showing one example of a schematic configuration of a hydrogen generation apparatus according to Embodiment 9.

FIG. 11 is a schematic diagram showing one example of a schematic configuration of the hydrogen generation apparatus according to Embodiment 9.

In the example shown in FIG. 11, the fundamental configuration of the hydrogen generation apparatus 100 according to the present embodiment is the same as that of the hydrogen generation apparatus 100 according to Embodiment 1. However, the hydrogen generation apparatus 100 according to the present embodiment is different from the hydrogen generation apparatus 100 according to Embodiment 1 in that, in the hydrogen generation apparatus 100 according to the present embodiment, the reformer 1 is provided with a temperature detector 20.

The temperature detector 20 is configured to detect the temperature of the reformer 1, and output the detected temperature to the controller 10. It should be noted that the temperature detector 20 may be configured to directly detect the temperature of the reformer 1, or may be configured to indirectly detect the temperature of the reformer 1. For example, the temperature detector 20 may be configured to detect the temperature of the reformer 1 by detecting the temperature of the combustor 2.

[Operations of Hydrogen Generation Apparatus]

Next, operations of the hydrogen generation apparatus 100 according to Embodiment 9 are described with reference to FIG. 11 and FIG. 12.

Figure 12:
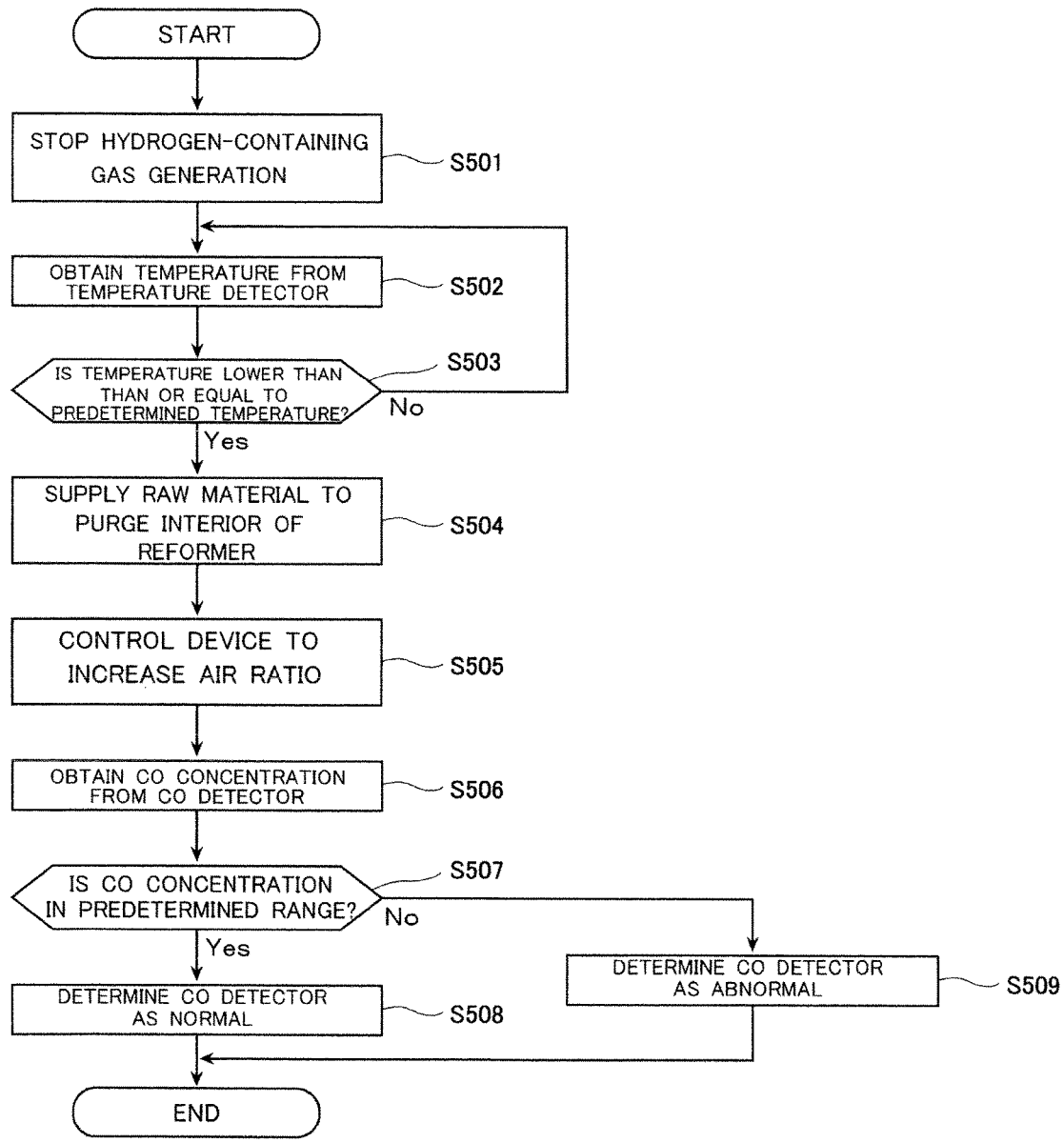
FIG. 12 is a flowchart showing one example of schematic operations of the hydrogen generation apparatus according to Embodiment 9.

FIG. 12 is a flowchart showing one example of schematic operations of the hydrogen generation apparatus according to Embodiment 9.

As shown in FIG. 12, when an operation stop signal for the hydrogen generation apparatus 100 is inputted (START), the controller 10 stops the reformer 1 from generating the hydrogen-containing gas (step S501).

Next, the controller 10 obtains a temperature in the reformer 1, which is detected by the temperature detector 20

(step S502). Then, the controller 10 determines whether or not the temperature obtained in step S502 is lower than or equal to a predetermined temperature (step S503). The predetermined temperature herein is set to a temperature that does not cause carbon deposition in the reformer 1. The predetermined temperature is suitably set in accordance with, for example, the type of a reforming catalyst used in the reformer 1.

If the temperature obtained in step S502 is neither lower than nor equal to the predetermined temperature (No in step S503), the controller 10 repeats step S502 and step S503 until the temperature obtained in step S502 becomes lower than or equal to the predetermined temperature. On the other hand, if the temperature obtained in step S502 is lower than or equal to the predetermined temperature (Yes in step S503), the controller 10 proceeds to step S504.

In step S504, the amount of raw material relative to steam in the reformer 1 is made greater than that during the generation of the hydrogen-containing gas. Specifically, the controller 10 performs control to supply the raw material into the reformer 1, thereby purging the interior of the reformer 1 with the raw material.

Next, the controller 10 controls at least one of the air supply device 3 and the fuel supply device 4 to increase the air ratio in the combustor 2 such that the CO concentration in the flue gas increases (step S505). Then, the controller 10 obtains, from the CO detector 5, a carbon monoxide concentration detected by the CO detector 5 (step S506). Thereafter, the controller 10 determines whether the carbon monoxide concentration obtained in step S506 is in the predetermined range (step S507).

If it is determined that the carbon monoxide concentration obtained in step S506 is in the predetermined range (Yes in step S507), the controller 10 determines that the detection sensitivity of the CO detector 5 is normal (step S508), and ends the flow.

On the other hand, if it is determined that the carbon monoxide concentration obtained in step S506 is not in the predetermined range (No in step S507), the controller 10 determines that the detection sensitivity of the CO detector 5 is abnormal (step S509), and ends the flow.

It should be noted that the present embodiment is configured such that the interior of the reformer 1 is purged with the raw material, and thereby when the abnormality test is performed, the amount of raw material relative to steam in the reformer 1 is greater than that during the generation of the hydrogen-containing gas. However, the present embodiment is not limited to this configuration. The present embodiment may adopt any configuration so long as when the abnormality test is performed, the amount of raw material relative to steam in the reformer 1 is greater than that during the generation of the hydrogen-containing gas.

Embodiment 10

A hydrogen generation apparatus according to Embodiment 10 is configured such that, in the hydrogen generation apparatus according to any one of Embodiments 1 to 9, after stopping the reformer from generating the hydrogen-containing gas, the controller tests the CO detector for abnormality after replenishing an interior of the reformer with the raw material. It should be noted that, other than the above feature, the configuration of the hydrogen generation apparatus according to the present embodiment may be the same as the configuration of the hydrogen generation apparatus according to any one of Embodiments 1 to 9.

According to the above configuration, compared to conventional hydrogen generation apparatuses, the detection sensitivity of the CO detector can be tested more easily. Moreover, a possibility that the CO concentration increases excessively can be reduced compared to a case where the CO concentration is increased by decreasing the air ratio. If the temperature of the reformer increases during the abnormality test of the CO detector when the amount of raw material relative to steam in the reformer 1 is greater than that during the generation of the hydrogen-containing gas, then carbon deposition tends to occur in the reformer. However, the above-described configuration makes it possible to suppress the occurrence of carbon deposition in the reformer.

[Configuration of Hydrogen Generation Apparatus]

Figure 13:
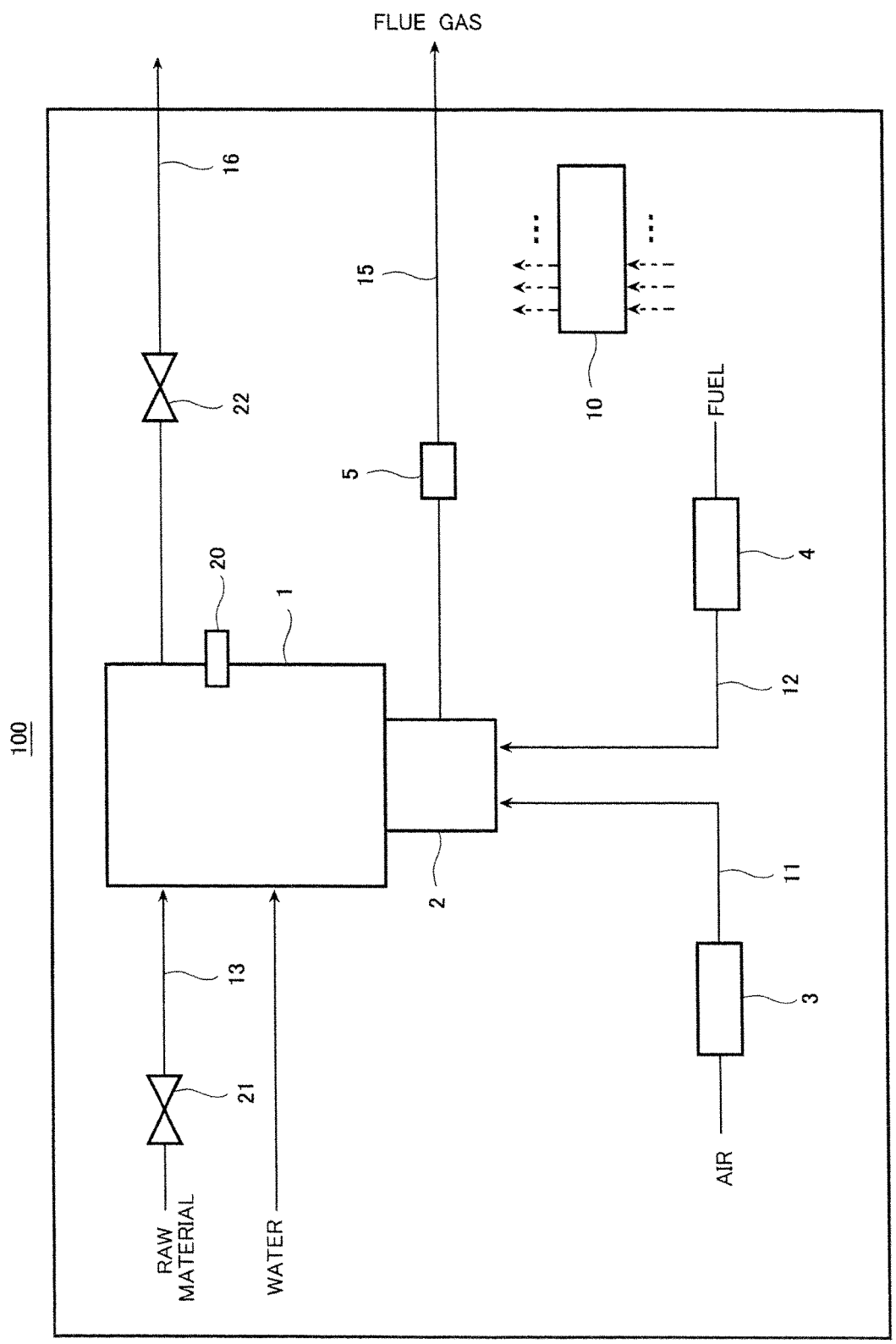
FIG. 13 is a schematic diagram showing one example of a schematic configuration of a hydrogen generation apparatus according to Embodiment 10.

FIG. 13 is a schematic diagram showing one example of a schematic configuration of the hydrogen generation apparatus according to Embodiment 10.

In the example shown in FIG. 13, the fundamental configuration of the hydrogen generation apparatus 100 according to the present embodiment is the same as that of the hydrogen generation apparatus 100 according to Embodiment 1. However, the hydrogen generation apparatus 100 according to the present embodiment is different from the hydrogen generation apparatus 100 according to Embodiment 1 in the following points: the reformer 1 is provided with the temperature detector 20; a raw material supply passage 13 is provided with an on-off valve 21; and a hydrogen-containing gas supply passage 16 is provided with an on-off valve 22.

The raw material supply passage 13 is connected to the reformer 1. The raw material flows through the raw material supply passage 13. The on-off valve 21 may be an electrically driven on-off valve such as a solenoid valve, or may be driven by gas pressure, for example. The on-off valve 21 may be configured in any form, so long as the on-off valve 21 is configured to open and close the gas passage in the raw material supply passage 13.

The hydrogen-containing gas supply passage 16 is connected to the reformer 1. The hydrogen-containing gas that is fed from the reformer 1 flows through the hydrogen-containing gas supply passage 16. The on-off valve 22 may be an electrically driven on-off valve such as a solenoid valve, or may be driven by gas pressure, for example. The on-off valve 22 may be configured in any form, so long as the on-off valve 22 is configured to open and close the gas passage in the hydrogen-containing gas supply passage 16.

[Operations of Hydrogen Generation Apparatus]

Next, operations of the hydrogen generation apparatus 100 according to Embodiment 10 are described with reference to FIG. 13 and FIG. 14.

While the stop process of the hydrogen generation apparatus 100 is being performed and/or while the hydrogen generation apparatus 100 is in a standby state, the on-off valve 21 and the on-off valve 22 are closed, and thereby these on-off valves seal a space that includes the reformer 1. When the temperature of the reformer 1 decreases, the pressure in the space including the reformer 1 becomes a negative pressure. In response, the on-off valve 21 is opened, and a replenishing process of replenishing the reformer 1 with the raw material is performed.

It should be noted that the standby state of the hydrogen generation apparatus herein refers to a state of the hydrogen generation apparatus from when the stop process of the hydrogen generation apparatus is ended to when the next start-up process of the hydrogen generation apparatus is started.

The hydrogen generation apparatus 100 according to the present embodiment performs the abnormality test of the CO detector 5 when performing the replenishing process. Hereinafter, a detailed description is given with reference to FIG. 13 and FIG. 14.

Figure 14:
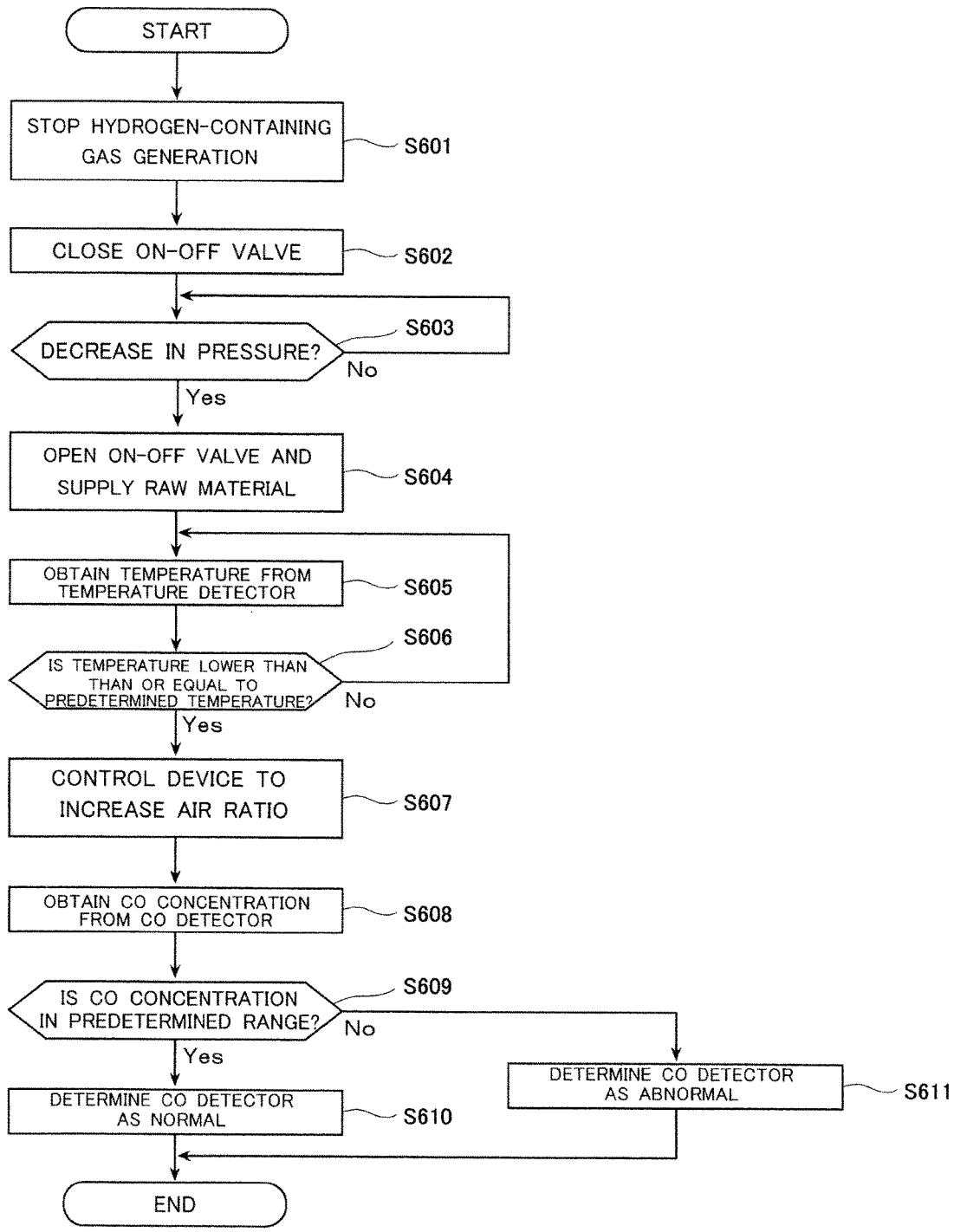
FIG. 14 is a flowchart showing one example of schematic operations of the hydrogen generation apparatus according to Embodiment 10.

FIG. 14 is a flowchart showing one example of schematic operations of the hydrogen generation apparatus according to Embodiment 10.

As shown in FIG. 14, when an operation stop signal for the hydrogen generation apparatus 100 is inputted (START), the controller 10 stops the reformer 1 from generating the hydrogen-containing gas (step S601). Specifically, the controller 10 stops the supply of the raw material and steam to the reformer 1. It should be noted that stopping the supply of steam means stopping the supply of water to the evaporator and stopping the heating of the evaporator.

Thereafter, the controller 10 closes the on-off valve 21 and the on-off valve 22 (step S602). Then, the controller 10 detects a decrease in the pressure in the sealed space including the reformer 1 by means of a detector (e.g., a pressure detector or a temperature detector), which is configured to directly or indirectly detect the pressure in the sealed space including the reformer 1 (Yes in step S603). Subsequently, the controller 10 performs control to replenish the space including the reformer 1 with the raw material (step S604). Specifically, the controller 10 opens the on-off valve 21. Since a raw material source that is not shown and that has a predetermined supply pressure higher than the atmospheric pressure is connected to the raw material supply passage 13, when the on-off valve 21 is opened, the raw material flows through the raw material supply passage 13, and the space including the reformer 1 is replenished with the raw material. In this manner, at least part of the decrease in the pressure in the reformer 1 is compensated for. As a result, the amount of raw material relative to steam in the reformer 1 becomes greater than that during the generation of the hydrogen-containing gas.

Next, the controller 10 obtains a temperature in the reformer 1 (the temperature of the reforming catalyst), which is detected by the temperature detector 20 (step S605). Then, the controller 10 determines whether or not the temperature obtained in step S605 is lower than or equal to the predetermined temperature (step S606).

If the temperature obtained in step S605 is neither lower than nor equal to the predetermined temperature (No in step S606), the controller 10 repeats step S605 and step S606 until the temperature obtained in step S605 becomes lower than or equal to the predetermined temperature. On the other hand, if the temperature obtained in step S605 is lower than or equal to the predetermined temperature (Yes in step S606), the controller 10 proceeds to step S607. The predetermined temperature herein is set to a temperature that does not cause carbon deposition in the reformer 1.

In step S607, the controller 10 controls at least one of the air supply device 3 and the fuel supply device 4 to increase the air ratio in the combustor 2 such that the CO concentration in the flue gas increases.

Next, the controller 10 obtains, from the CO detector 5, a carbon monoxide concentration detected by the CO detector 5 (step S608). Then, the controller 10 determines whether the carbon monoxide concentration obtained in step S608 is in the predetermined range (step S609).

If it is determined that the carbon monoxide concentration obtained in step S608 is in the predetermined range (Yes in step S609), the controller 10 determines that the detection sensitivity of the CO detector 5 is normal (step S610), and ends the flow.

On the other hand, if it is determined that the carbon monoxide concentration obtained in step S608 is not in the predetermined range (No in step S609), the controller 10 determines that the detection sensitivity of the CO detector 5 is abnormal (step S611), and ends the flow.

It should be noted that the hydrogen generation apparatus according to the present embodiment is configured such that the reformer 1 is sealed after the hydrogen-containing gas generation by the reformer 1 is stopped. However, as an alternative, the hydrogen generation apparatus according to the present embodiment may be configured such that the on-off valve 22 is eliminated and the reformer 1 is opened to be in communication with the atmosphere. Also in this case, similar to the above-described flow, the reformer 1 may be replenished with the raw material in accordance with a decrease in the temperature of the reformer 1 in order to reduce inflow of air into the hydrogen generation apparatus 100 through an atmosphere communication opening.

Embodiment 11

A hydrogen generation apparatus according to Embodiment 11 is configured such that, in the hydrogen generation apparatus according to any one of Embodiments 1 to 10, in a case where the hydrogen generation apparatus is started up when a predetermined time has elapsed after testing the CO detector for abnormality, the controller tests the CO detector for abnormality during a start-up process, and in a case where the hydrogen generation apparatus is started up when the predetermined time has not elapsed after testing the CO detector for abnormality, the controller refrains from testing the CO detector for abnormality during the start-up process. It should be noted that, other than the above feature, the configuration of the hydrogen generation apparatus according to the present embodiment may be the same as the configuration of the hydrogen generation apparatus according to any one of Embodiments 1 to 10.

According to the above configuration, unnecessary abnormality tests of the CO detector are not performed. Therefore, the hydrogen generation apparatus can be started up promptly, and whether there is an abnormality occurring in the CO detector can be confirmed even after a long period of time has elapsed since a previous stop of the hydrogen generation apparatus.

It should be noted that since the configuration of the hydrogen generation apparatus according to Embodiment 11 is the same as the configuration of the hydrogen generation apparatus according to Embodiment 1, the description below describes an operation that is performed when a start-up start signal for the hydrogen generation apparatus is inputted to the controller. A start-up process (start-up operation; start-up step) of the hydrogen generation apparatus 100 is performed in the same manner as a start-up process of a known hydrogen generation apparatus. Therefore, a detailed description of the start-up process is omitted below.

Figure 15:
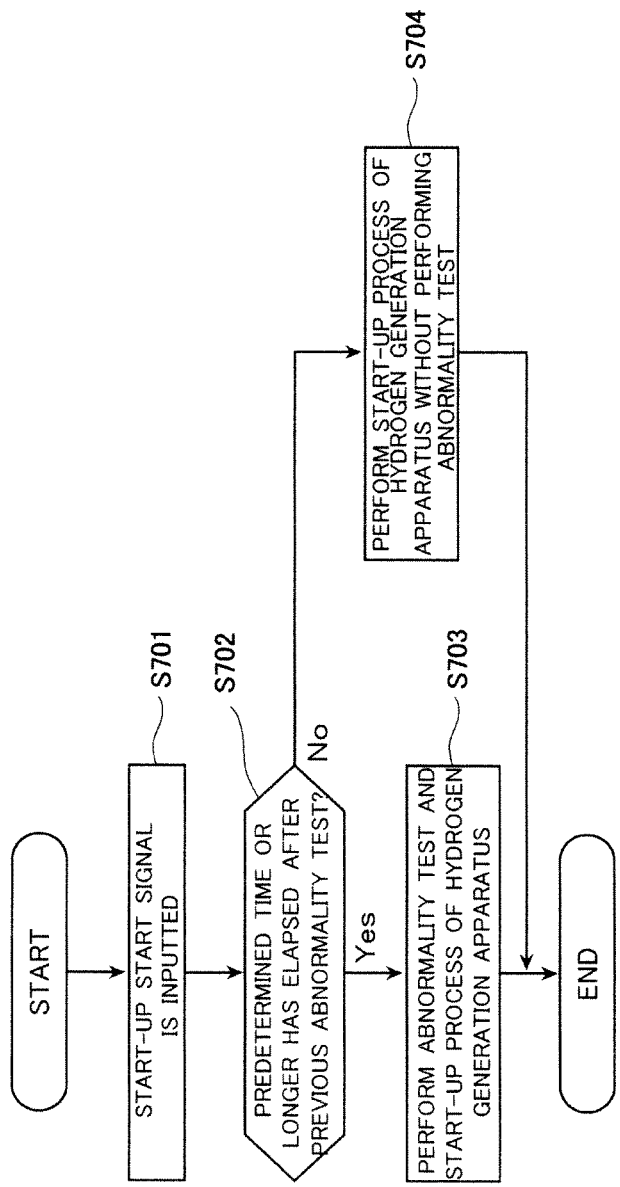
FIG. 15 is a flowchart showing one example of schematic operations of a hydrogen generation apparatus according to Embodiment 11.

FIG. 15 is a flowchart showing one example of schematic operations of the hydrogen generation apparatus according to Embodiment 11.

As shown in FIG. 15, when a start-up start signal for the hydrogen generation apparatus 100 is inputted to the controller 10 (step S701), the controller 10 determines whether a predetermined time or longer has elapsed after a previously performed abnormality test of the CO detector 5 (step S702). The predetermined time herein can be set as desired. The predetermined time is suitably set from the viewpoint of reducing the frequency of abnormality tests performed on the CO detector 5. For example, the predetermined time may be set to 3 to 5 hours.

It should be noted that examples of a case where the start-up start signal for the hydrogen generation apparatus 100 is inputted to the controller 10 include: a case where a user or the like operates a remote controller or the like to start the start-up of the hydrogen generation apparatus 100; and a case where an operation start time for the hydrogen generation apparatus 100 has arrived.

If the predetermined time or longer has elapsed after the previously performed abnormality test of the CO detector 5 (Yes in step S702), the controller 10 performs an abnormality test of the CO detector 5 and a start-up process of the hydrogen generation apparatus 100 (step S703), and ends the flow.

On the other hand, if the predetermined time or longer has not yet elapsed after the previously performed abnormality test of the CO detector 5 (No in step S702), the controller 10 performs a start-up process of the hydrogen generation apparatus 100 without performing an abnormality test of the CO detector 5 (step S704), and ends the flow.

Embodiment 12

A hydrogen generation apparatus according to Embodiment 12 is configured such that, in the hydrogen generation apparatus according to any one of Embodiments 1 to 11, in a case where, after testing the CO detector for abnormality, the hydrogen generation apparatus has stopped either during a start-up process or within a predetermined operating time and is then restarted, the controller refrains from testing the CO detector for abnormality during restart of the hydrogen generation apparatus. It should be noted that, other than the above feature, the configuration of the hydrogen generation apparatus according to the present embodiment may be the same as the configuration of the hydrogen generation apparatus according to any one of Embodiments 1 to 11.

According to the above configuration, unnecessary abnormality tests of the CO detector are not performed. Therefore, the hydrogen generation apparatus can be started up promptly.

It should be noted that since the configuration of the hydrogen generation apparatus according to Embodiment 12 is the same as the configuration of the hydrogen generation apparatus according to Embodiment 1, the description below describes an operation that is performed when a start-up start signal for the hydrogen generation apparatus is inputted to the controller.

Figure 16:
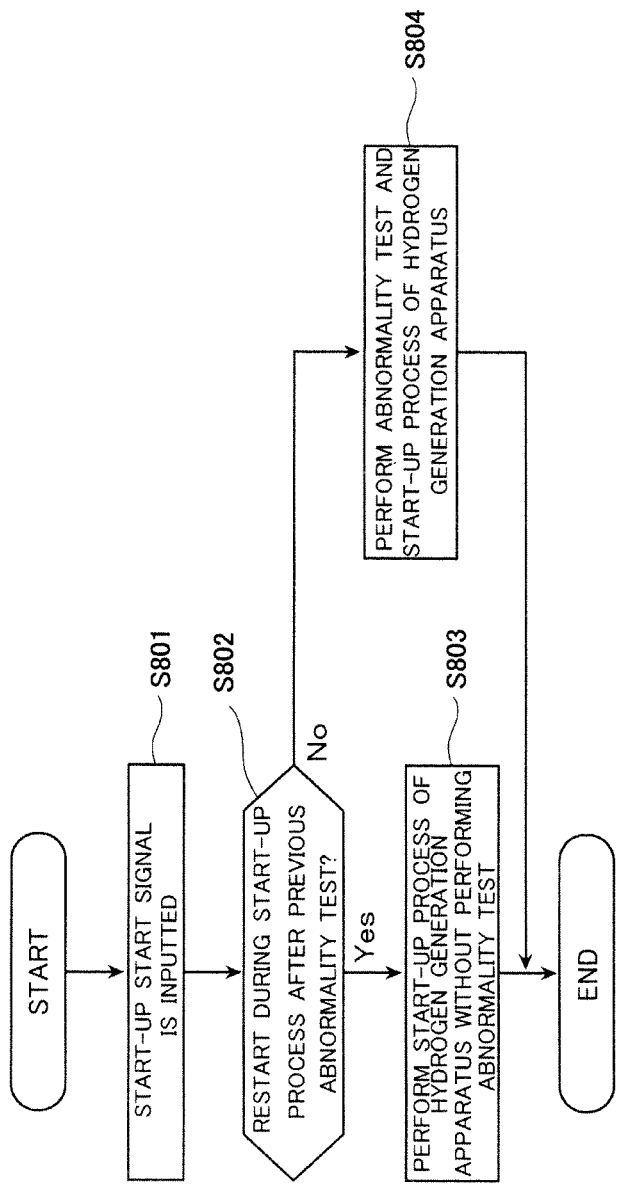
FIG. 16 is a flowchart showing one example of schematic operations of a hydrogen generation apparatus according to Embodiment 12.

FIG. 16 is a flowchart showing one example of schematic operations of the hydrogen generation apparatus according to Embodiment 12.

As shown in FIG. 16, when a start-up start signal for the hydrogen generation apparatus 100 is inputted to the controller 10 (step S801), the controller 10 determines whether the start-up start signal has been inputted after a previously performed abnormality test of the CO detector 5 in order to perform a restart of the hydrogen generation apparatus 100 during a start-up process of the hydrogen generation apparatus 100 (i.e., a case where, during a start-up process, the hydrogen generation apparatus 100 stops and is then restarted) (step S802). Here, performing a restart of the hydrogen generation apparatus 100 during a start-up process means the following case: an accidental abnormality (e.g., air biting of a pump that serves as the water supply device) occurs during a start-up process of the hydrogen generation apparatus 100, and thereby it becomes temporarily impossible to continue the start-up process; and the hydrogen generation apparatus 100 is started up again.

If it is determined to be a restart of the hydrogen generation apparatus 100 (Yes in step S802), the controller 10 performs a start-up process of the hydrogen generation apparatus 100 without performing an abnormality test of the CO detector 5 (step S803), and ends the flow.

On the other hand, if it is determined not to be a restart of the hydrogen generation apparatus 100 (No in step S802), the controller 10 performs an abnormality test of the CO detector 5 and a start-up process of the hydrogen generation apparatus 100 (step S804), and ends the flow. It should be noted that if the controller 10 performs the start-up when the predetermined time has not yet elapsed after the previously performed abnormality test of the CO detector 5, then the controller 10 need not perform the abnormality test.

Figure 17:
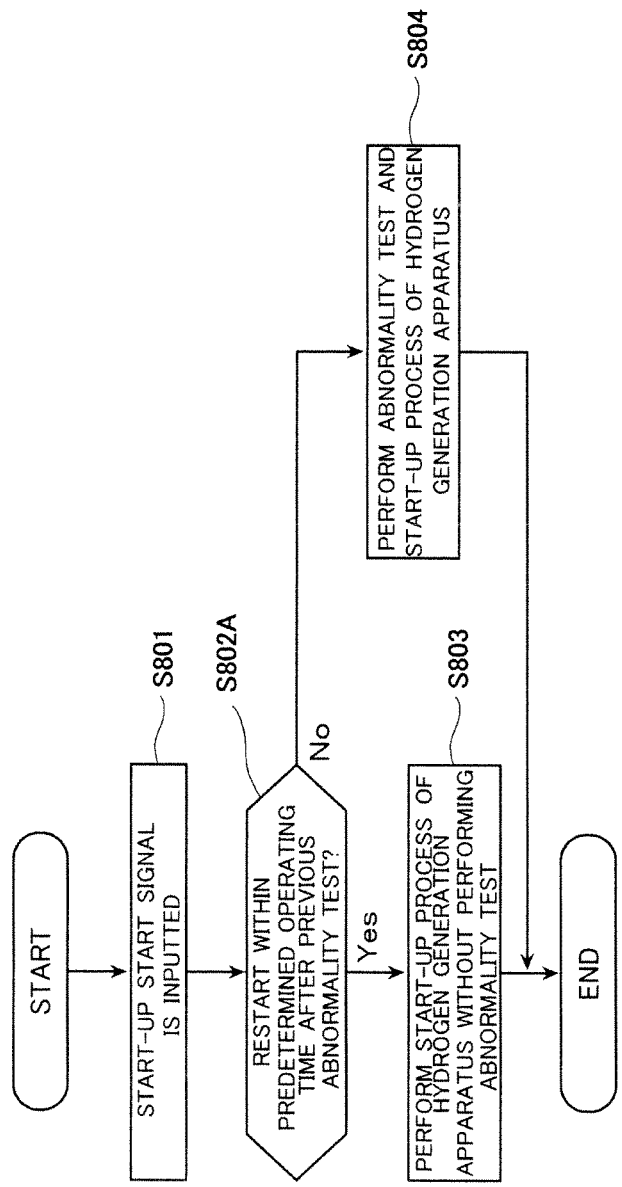
FIG. 17 is a flowchart showing another example of schematic operations of the hydrogen generation apparatus according to Embodiment 12.

FIG. 17 is a flowchart showing another example of schematic operations of the hydrogen generation apparatus according to Embodiment 12.

The schematic operations in the example shown in FIG. 17 are fundamentally the same as the schematic operations in the example shown in FIG. 16. However, the operations in the example shown in FIG. 17 are different from the operations in the example shown in FIG. 16 in that, in the operations in the example shown in FIG. 17, step S802A is performed instead of step S802. Specifically, the controller 10 determines whether the start-up start signal for the hydrogen generation apparatus 100, inputted in step S801, was inputted when the hydrogen generation apparatus 100 stopped within a predetermined operating time after the previously performed abnormality test of the CO detector 5 in order to perform a restart of the hydrogen generation apparatus 100.

The operating time herein refers to an operation (operating) time of the hydrogen generation apparatus 100, which has elapsed after the hydrogen generation apparatus 100 has started supplying the hydrogen-containing gas to the hydrogen utilizing equipment. The predetermined operating time may be set as desired. The predetermined operating time is suitably set from the viewpoint of reducing the frequency of abnormality tests performed on the CO detector 5. For example, the predetermined operating time may be set to 1 to 2 hours.

If it is determined to be a restart of the hydrogen generation apparatus 100 within the predetermined operating time (Yes in step S802A), the controller 10 performs a start-up process of the hydrogen generation apparatus 100 without performing an abnormality test of the CO detector 5 (step S803), and ends the flow.

On the other hand, if it is determined not to be a restart of the hydrogen generation apparatus 100 within the predetermined operating time (No in step S802A), the controller 10 performs an abnormality test of the CO detector 5 and a start-up process of the hydrogen generation apparatus 100 (step S804), and ends the flow.

Embodiment 13

A fuel cell system according to Embodiment 13 includes: the hydrogen generation apparatus according to any one of Embodiments 1 to 12; and a fuel cell configured to generate electric power by using the hydrogen-containing gas that is supplied from the hydrogen generation apparatus.

According to the above configuration, compared to conventional fuel cell systems, the detection sensitivity of the CO detector can be tested more easily. In addition, a possibility that the CO concentration increases excessively can be reduced compared to a case where the CO concentration is increased by decreasing the air ratio.

Figure 18:
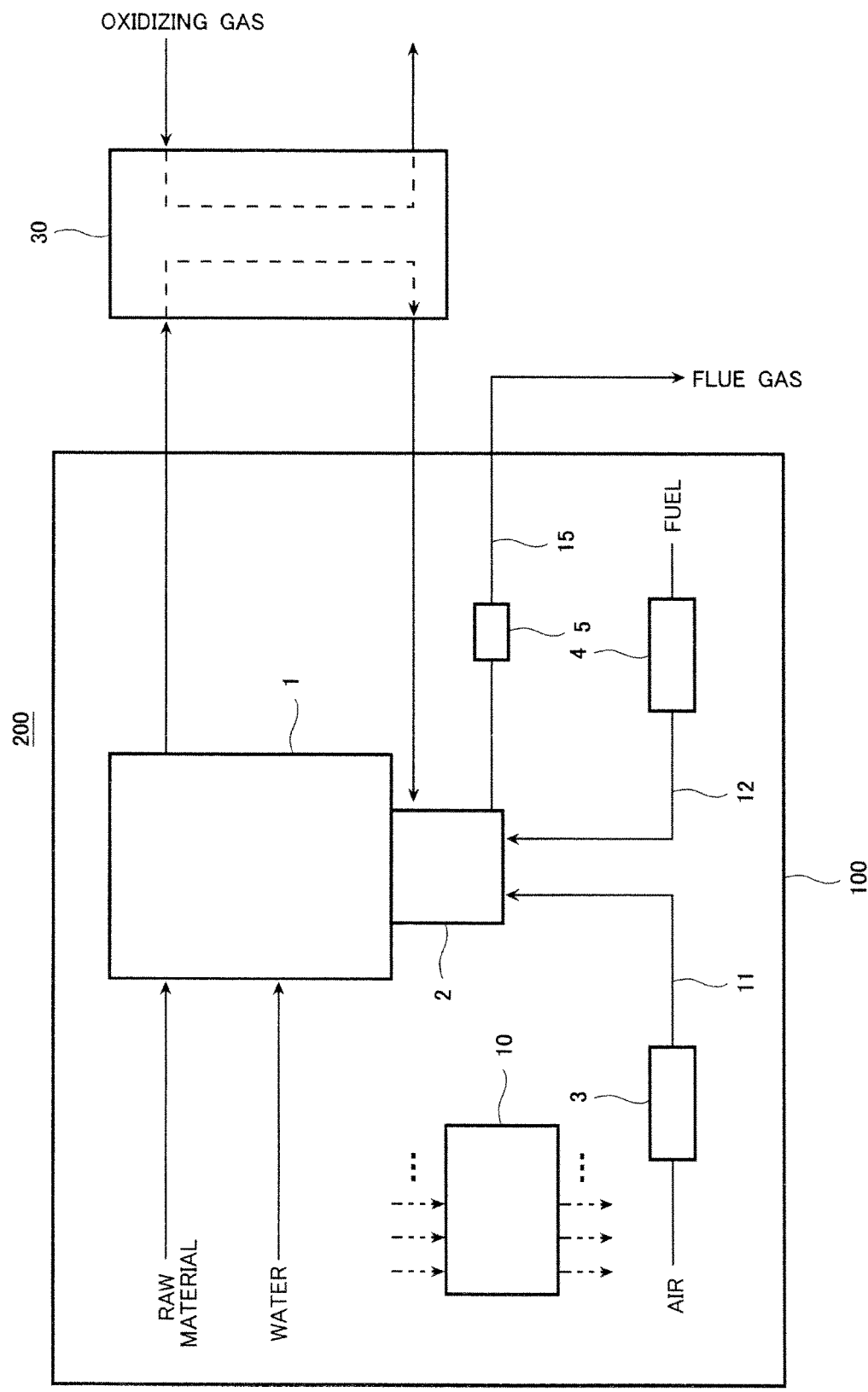
FIG. 18 is a schematic diagram showing one example of a schematic configuration of a fuel cell system according to Embodiment 13.

FIG. 18 is a schematic diagram showing one example of a schematic configuration of the fuel cell system according to Embodiment 13.

In the example shown in FIG. 18, a fuel cell system 200 according to Embodiment 13 includes the hydrogen generation apparatus 100 according to Embodiment 1 and a fuel cell 30.

The fuel cell 30 is configured to generate electric power by using the hydrogen-containing gas that is supplied from the hydrogen generation apparatus 100. The fuel cell 30 may be any type of fuel cell. For example, a polymer electrolyte fuel cell (PEFC), a solid oxide fuel cell (SOFC), or a phosphoric acid fuel cell (PAFC) may be used as the fuel cell 30.

During a power generation operation, the fuel cell system 200 generates electric power by using the hydrogen-containing gas that is supplied from the hydrogen generation apparatus 100. If the fuel cell 30 is seen as the hydrogen utilizing equipment in Embodiment 1, the operations of the hydrogen generation apparatus 100 according to the present embodiment are the same as those described in Embodiment 1. Therefore, a detailed description of the operations is omitted.

Although Embodiment 13 describes the configuration that includes the hydrogen generation apparatus 100 according to Embodiment 1, the fuel cell system 200 according to Embodiment 14 may, of course, alternatively include the hydrogen generation apparatus 100 according to any one of Embodiments 2 to 12.

Embodiment 14

A fuel cell system according to Embodiment 14 is configured such that, in the fuel cell system according to Embodiment 13, the controller tests the CO detector for abnormality during a power generation operation.

In the fuel cell system according to present embodiment, the controller may control at least one of the fuel supply device, air supply device, stack current, raw material supply device, and the steam supply device to increase the air ratio in the combustor such that the CO concentration in the flue gas increases.

According to the above configuration, compared to conventional fuel cell systems, the detection sensitivity of the CO detector can be tested more easily. In addition, a possibility that the CO concentration increases excessively can be reduced compared to a case where the CO concentration is increased by decreasing the air ratio.

[Configuration of Fuel Cell System]

Figure 19:
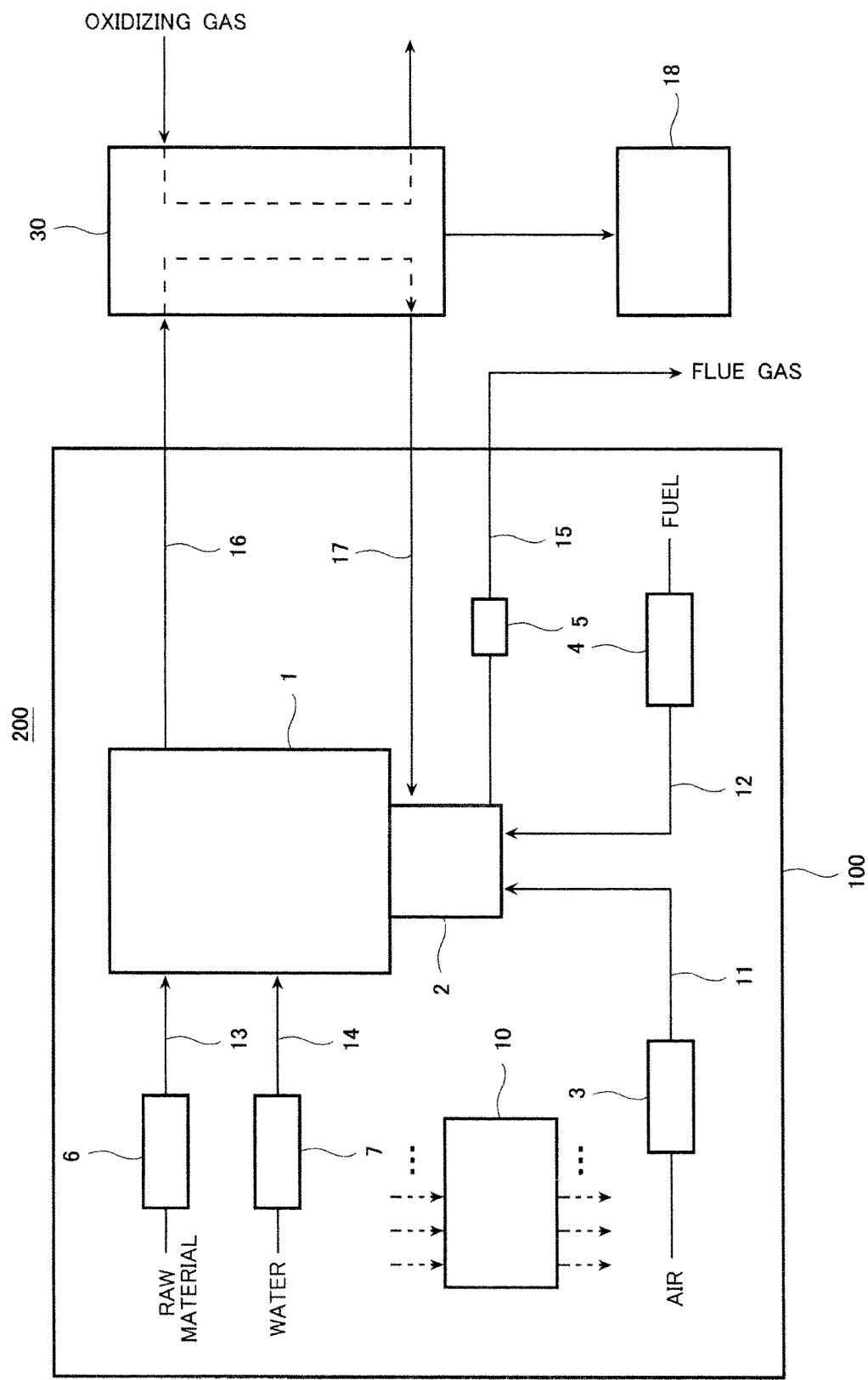
FIG. 19 is a schematic diagram showing one example of a schematic configuration of a fuel cell system according to Embodiment 14.

FIG. 19 is a schematic diagram showing one example of a schematic configuration of the fuel cell system according to Embodiment 14.

In the example shown in FIG. 19, the fundamental configuration of the fuel cell system 200 according to Embodiment 14 is the same as that of the fuel cell system 200 according to Embodiment 13. However, the fuel cell system 200 according to Embodiment 14 is different from the fuel cell system 200 according to Embodiment 13, in that the fuel cell system 200 according to Embodiment 14 includes an output controller 18 configured to output the electric power generated by the fuel cell 30 to an external load or the like.

The output controller 18 may be configured in any form, so long as the output controller 18 is configured to convert DC power generated by the fuel cell 30 into AC power, and output the AC power to the external load or the like. The output controller 18 may be constituted by an inverter, or may be constituted by an inverter and a converter, for example.

The raw material supply passage 13 and a water supply passage 14 are connected to the reformer 1 of the hydrogen generation apparatus 100. A raw material supply device 6 is provided on the raw material supply passage 13. A steam supply device 7 is provided on the water supply passage 14.

The steam supply device 7 includes an evaporator and a water supply device. The amount of steam to be supplied by the steam supply device 7 is determined by controlling, by means of the controller 10, at least one of the water supply device and a heating device heating the evaporator. It should be noted that the heating device heating the evaporator may be the combustor 2, or may be a combustor provided separately from the combustor 2, or may be a heater or the like.

The hydrogen-containing gas supply passage 16, through which the hydrogen-containing gas generated by the reformer 1 is supplied to the fuel cell 30, is connected to the reformer 1. In addition, an off hydrogen-containing gas passage 17, through which the hydrogen-containing gas that has not been used by the fuel cell 30 is supplied to the combustor 2, is connected to the fuel cell 30.

Although in the present embodiment the controller 10 is configured to control the devices included in the fuel cell system 200, the present embodiment is not thus limited. An alternative configuration may be adopted, in which: other controllers (a group of controllers) provided separately from the controller 10 are configured to control the devices included in the fuel cell system 200; and the controller 10 and the other controllers (the group of controllers) perform distributed control in cooperation with each other.

[Operations of Fuel Cell System]

Next, operations of the hydrogen generation apparatus 100 according to Embodiment 14 are described with reference to FIG. 19 and FIG. 20. It should be noted that a power generation operation of the fuel cell system 200 is performed in the same manner as a power generation operation of a known fuel cell system. Therefore, a detailed description of the power generation operation is omitted below. The description below describes an abnormality test of testing the CO detector 5 for abnormality. In the fuel cell system according to the present embodiment, the abnormality test is performed during the power generation operation of the fuel cell.

Figure 20:
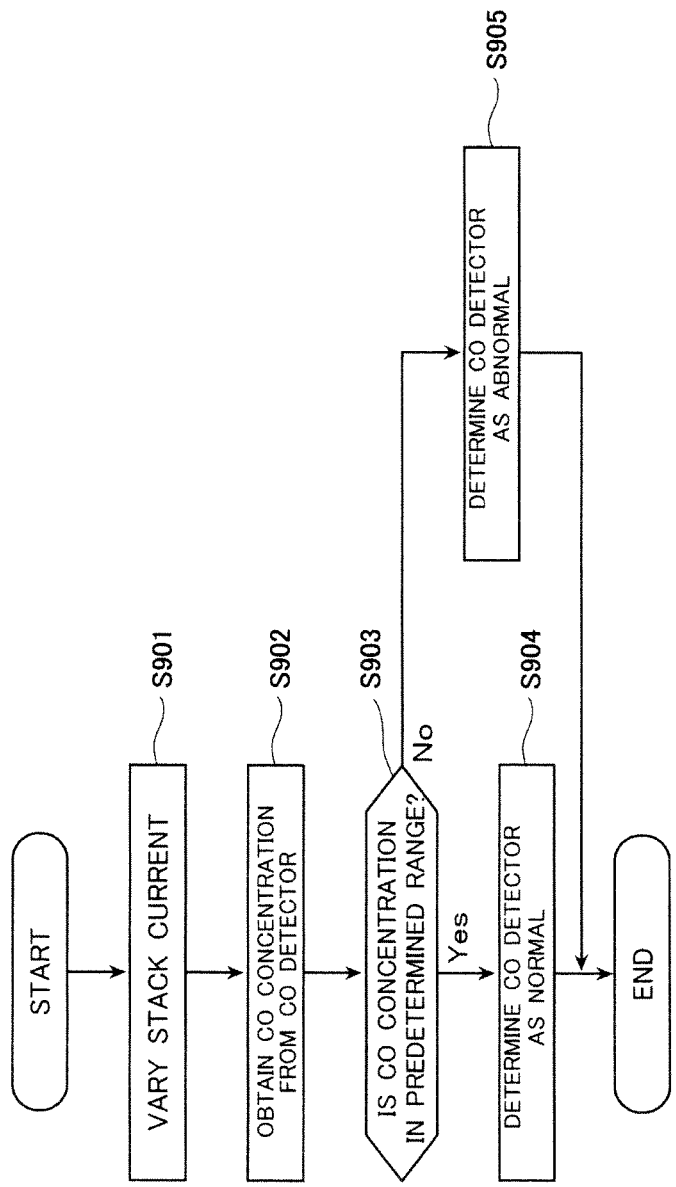
FIG. 20 is a flowchart showing one example of schematic operations of the fuel cell system according to Embodiment 14.

FIG. 20 is a flowchart showing one example of schematic operations of the fuel cell system according to Embodiment 14.

As shown in FIG. 20, the controller 10 controls the output controller 18 to vary a stack current (electric power) outputted from the fuel cell 30 such that the CO concentration in the flue gas increases (i.e., such that the air ratio in the combustor 2 increases) (step S901). Specifically, the stack current outputted from the fuel cell 30 is increased. As a result, the amount of hydrogen consumed by the fuel cell 30 increases, and the flow rate of the hydrogen-containing gas that is supplied to the combustor 2 decreases. Consequently, the air ratio in the combustor 2 increases, and carbon monoxide is generated in the combustor 2.

Next, the controller 10 obtains, from the CO detector 5, a carbon monoxide concentration detected by the CO detector 5 (step S902). Then, the controller 10 determines whether the carbon monoxide concentration obtained in step S902 is in the predetermined range (step S903).

If it is determined that the carbon monoxide concentration obtained in step S902 is in the predetermined range (Yes in step S903), the controller 10 determines that the detection sensitivity of the CO detector 5 is normal (step S904), and ends the abnormality test. If it is determined that the carbon monoxide concentration obtained in step S902 is not in the predetermined range (No in step S903), the controller 10 determines that the detection sensitivity of the CO detector 5 is abnormal (step S904), and ends the abnormality test.

It should be noted that, after the stack current is varied in step S901, the controller 10 may control the output controller 18 at any timing, such that the stack current outputted from the fuel cell 30 becomes the stack current at a point before the stack current was varied in step S901.

[Variation 1]

Next, a variation of the fuel cell system according to Embodiment 14 is described.

A fuel cell system according to Variation 1 of Embodiment 14 is configured such that the controller controls the raw material supply device and the steam supply device to increase the air ratio in the combustor such that the CO concentration in the flue gas increases.

According to the above configuration, compared to conventional fuel cell systems, the detection sensitivity of the CO detector can be tested more easily. In addition, a possibility that the CO concentration increases excessively can be reduced compared to a case where the CO concentration is increased by decreasing the air ratio.

It should be noted that since the configuration of the fuel cell system according to Variation 1 is the same as the configuration of the fuel cell system according to Embodiment 14, the description below describes the abnormality test of the CO detector.

Figure 21:
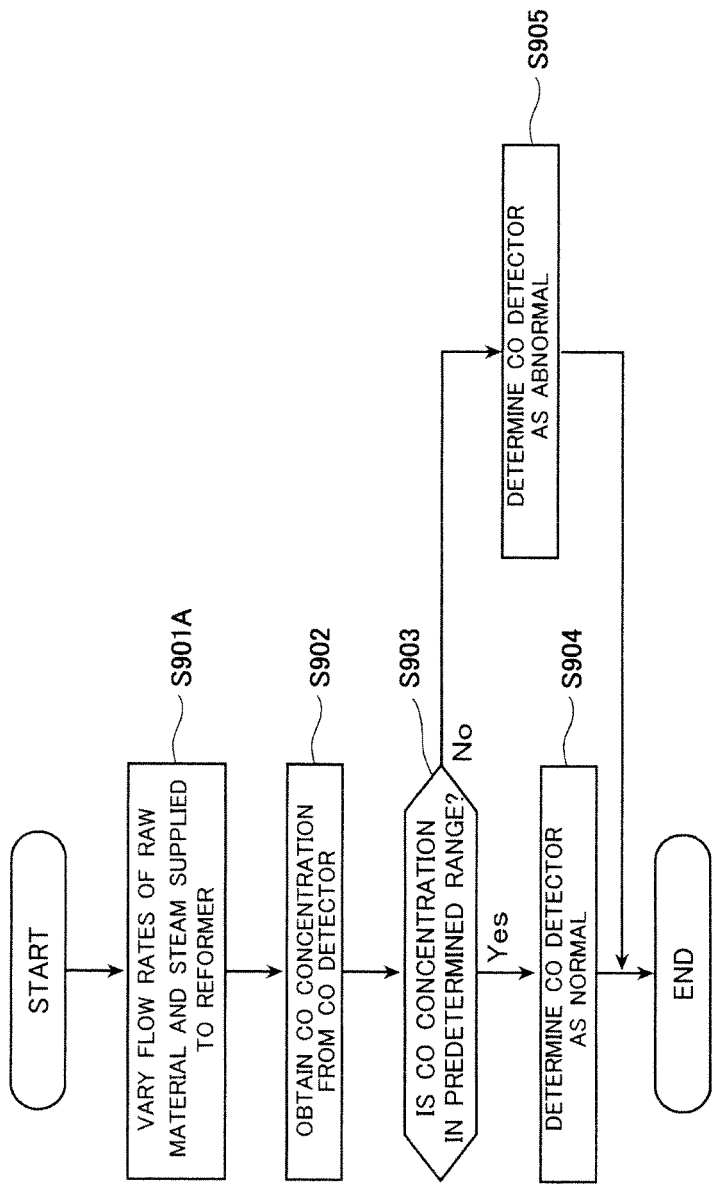
FIG. 21 is a flowchart showing one example of schematic operations of a fuel cell system according to Variation 1 of Embodiment 14.

FIG. 21 is a flowchart showing one example of schematic operations of the fuel cell system according to Variation 1 of Embodiment 14.

As shown in FIG. 21, the schematic operations of the fuel cell system 200 according to Variation 1 are fundamentally the same as the schematic operations of the fuel cell system 200 according to Embodiment 14. However, the operations of the fuel cell system 200 according to Variation 1 are different from the operations of the fuel cell system 200 according to Embodiment 14 in that, in the operations of the fuel cell system 200 according to Variation 1, step S901A is performed instead of step S901. Specifically, the controller 10 controls the raw material supply device 6 and the steam supply device 7 so as to vary the flow rates of the raw material and steam supplied to the reformer 1 (step S901A).

To be more specific, the controller 10 controls the raw material supply device 6 and the steam supply device 7 to increase the air ratio in the combustor 2 (such that the CO concentration in the flue gas increases), thereby decreasing the flow rates of the raw material and steam supplied to the reformer 1. As a result, the hydrogen-containing gas generated in the reformer 1 decreases, and the flow rate of the hydrogen-containing gas supplied to the combustor 2 decreases. Consequently, the air ratio in the combustor 2 increases, and the flue gas with a high carbon monoxide concentration is generated in the combustor 2.

It should be noted that, after the flow rates of the raw material and steam are decreased in step S901A, the controller 10 may control the raw material supply device 6 and the steam supply device 7 at any timing, such that the flow rates of the raw material and steam become the flow rates at a point before the flow rates were decreased in step S901A.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The hydrogen generation apparatus, the fuel cell system including the hydrogen generation apparatus, the method of operating the hydrogen generation apparatus, and the method of operating the fuel cell system, according to the present invention, are capable of testing the detection sensitivity of the CO detector more easily than conventional art.

REFERENCE SIGNS LIST 1 reformer
2 combustor
3 air supply device
4 fuel supply device
5 CO detector
6 raw material supply device
7 steam supply device
10 controller
11 air supply passage
12 fuel supply passage
13 raw material supply passage
14 water supply passage
15 flue gas passage
16 hydrogen-containing gas supply passage
17 off hydrogen containing gas passage
18 output controller
20 temperature detector
21 on-off valve
22 on-off valve
30 fuel cell
40 notification device
100 hydrogen generation apparatus
200 fuel cell system

The invention claimed is:

1. A hydrogen generation apparatus comprising:
a reformer configured to generate a hydrogen-containing gas through a reforming reaction;
a combustor configured to heat the reformer;
an air supply device configured to supply air to the combustor;
a fuel supply device configured to supply a fuel to the combustor;
a CO detector configured to detect a carbon monoxide concentration in a flue gas discharged from the combustor; and
a controller configured to control at least one of the air supply device and the fuel supply device to increase an air ratio in the combustor such that combustion is performed under a condition that the CO concentration in the flue gas increases as the air ratio increases, and then test an operation of the CO detector.

2. The hydrogen generation apparatus according to claim 1, wherein
when the controller finds a problem as a result of the testing of the CO detector, the controller is configured to stop the hydrogen generation apparatus from operating.

3. The hydrogen generation apparatus according to claim 2, wherein when the controller finds a problem as a result of the testing, the controller is configured to prohibit restart of the hydrogen generation apparatus.

4. The hydrogen generation apparatus according to claim 1, further comprising a notification device configured to give a notification that there is a problem in the CO detector.

5. The hydrogen generation apparatus according to claim 1, wherein
after testing the operation of the CO detector, the controller is configured to control at least one of the air supply device and the fuel supply device to decrease the air ratio in the combustor such that the CO concentration in the flue gas decreases.

6. The hydrogen generation apparatus according to claim 1, wherein
after increasing the air ratio in the combustor such that the combustion is performed under the condition that the CO concentration in the flue gas increases as the air ratio increases, when a total amount of carbon monoxide in the flue gas discharged from the combustor has become greater than or equal to a first threshold, the controller is configured to control at least one of the air supply device and the fuel supply device to decrease the air ratio in the combustor such that the CO concentration in the flue gas decreases.

7. The hydrogen generation apparatus according to claim 5, wherein
after increasing the air ratio in the combustor such that the combustion is performed under the condition that the CO concentration in the flue gas increases as the air ratio increases, when a value of a product of a highest CO concentration generatable by the combustor and a time has become greater than or equal to a second threshold, the controller is configured to control at least one of the air supply device and the fuel supply device to decrease the air ratio in the combustor such that the CO concentration in the flue gas decreases.

8. The hydrogen generation apparatus according to claim 1, wherein
while the combustor is heating the reformer before the reformer starts generating the hydrogen-containing gas, the controller is configured to control at least one of the air supply device and the fuel supply device to increase the air ratio in the combustor such that the combustion is performed under the condition that the CO concentration in the flue gas increases as the air ratio increases, and then tests the operation of the CO detector.

9. The hydrogen generation apparatus according to claim 1, wherein
the controller is configured to test the operation of the CO detector when an amount of raw material relative to steam in the reformer is less than that during generation of the hydrogen-containing gas.

10. The hydrogen generation apparatus according to claim 9, wherein
the controller is configured to test the operation of the CO detector after stopping supply of the raw material to the reformer and purging an interior of the reformer with the steam.

11. The hydrogen generation apparatus according to claim 1, wherein
the controller is configured to test the operation of the CO detector when an amount of raw material relative to steam in the reformer is greater than that during generation of the hydrogen-containing gas and a temperature in the reformer is a temperature that does not cause carbon deposition.

12. The hydrogen generation apparatus according to claim 11, wherein
the controller tests the operation of the CO detector after stopping the reformer from generating the hydrogen-containing gas.

13. The hydrogen generation apparatus according to claim 11, wherein
after stopping the reformer from generating the hydrogen-containing gas, the controller is configured to test the operation of the CO detector when purging an interior of the reformer with the raw material.

14. The hydrogen generation apparatus according to claim 11, wherein
after stopping the reformer from generating the hydrogen-containing gas, the controller is configured to test the operation of the CO detector after replenishing an interior of the reformer with the raw material.

15. The hydrogen generation apparatus according to claim 1, wherein:
in a case where the hydrogen generation apparatus is started up when a predetermined time has elapsed after testing the operation of the CO detector, the controller is configured to test the CO detector during a start-up process, and
in a case where the hydrogen generation apparatus is started up when the predetermined time has not elapsed after testing the CO detector, the controller is configured to refrain from testing the operation of the CO detector during the start-up process.

16. The hydrogen generation apparatus according to claim 1, wherein
in a case where, after testing the operation of the CO detector, the hydrogen generation apparatus has stopped either during a start-up process or within a predetermined operating time and is then restarted, the controller is configured to refrain from testing the CO detector during restart of the hydrogen generation apparatus.

17. A fuel cell system comprising:
the hydrogen generation apparatus according to claim 1; and
a fuel cell configured to generate electric power by using the hydrogen-containing gas that is supplied from the hydrogen generation apparatus.

18. The fuel cell system according to claim 17, wherein
the controller is configured to test the operation of the CO detector during a power generation operation.

19. A method of operating a hydrogen generation apparatus, comprising:
generating a hydrogen-containing gas by a reformer;
combusting, by a combustor, a fuel supplied from a fuel supply device and air supplied from an air supply device to heat the reformer;
detecting, by a CO detector, a carbon monoxide concentration in a flue gas discharged from the combustor;
increasing an air ratio in the combustor such that combustion is performed under a condition that the CO concentration in the flue gas increases as the air ratio increases; and
performing an abnormality test of the CO detector after the increasing the air ratio in the combustor.

20. A method of operating a fuel cell system, comprising:
generating a hydrogen-containing gas by a reformer;
generating electric power by a fuel cell by using the hydrogen-containing gas;

combusting, by a combustor, a fuel supplied from a fuel supply device and air supplied from an air supply device to heat the reformer;

detecting, by a CO detector, a carbon monoxide concentration in a flue gas discharged from the combustor;

increasing an air ratio in the combustor such that combustion is performed under a condition that the CO concentration in the flue gas increases as the air ratio increases; and performing an abnormality test of the CO detector after the increasing the air ratio in the combustor.

21. The hydrogen generation apparatus according to claim 1, wherein in testing the operation of the CO detector, it is determined whether the CO detector works normally or abnormally.

22. The hydrogen generation apparatus according to claim 21, wherein it is determined that there is an abnormality in the CO detector when a detected CO amount for a given air ratio is out of a predetermined range.

23. The method according to claim 19, wherein in the abnormality test of the CO detector, it is determined whether the CO detector works normally or abnormally.

24. The method according to claim 20, wherein in the abnormality test of the CO detector, it is determined whether the CO detector works normally or abnormally.

* * * * *